(12) United States Patent
Kato et al.

(10) Patent No.: US 8,515,180 B2
(45) Date of Patent: Aug. 20, 2013

(54) IMAGE DATA CORRECTION APPARATUS AND METHOD USING FEATURE POINTS VECTOR DATA

(75) Inventors: Masami Kato, Sagamihara (JP); Yoshinori Ito, Tokyo (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 12/974,633

(22) Filed: Dec. 21, 2010

(65) Prior Publication Data

US 2011/0158542 A1    Jun. 30, 2011

(30) Foreign Application Priority Data

Dec. 28, 2009  (JP) ................................ 2009-298820

(51) Int. Cl.
*G06K 9/46* (2006.01)
(52) U.S. Cl.
USPC ............................. 382/195; 382/201; 382/254
(58) Field of Classification Search
None
See application file for complete search history.

(56) References Cited

U.S. PATENT DOCUMENTS

| 5,508,823 | A | 4/1996 | Kiyohara et al. |
| 7,699,423 | B2 | 4/2010 | Suwa et al. |
| 7,881,524 | B2 | 2/2011 | Matsugu et al. |
| 2009/0157707 | A1 | 6/2009 | Ito et al. |
| 2009/0220157 | A1* | 9/2009 | Kato et al. ................... 382/201 |
| 2010/0180189 | A1 | 7/2010 | Ito et al. |
| 2010/0209010 | A1 | 8/2010 | Kato et al. |
| 2011/0058741 | A1 | 3/2011 | Ito et al. |

FOREIGN PATENT DOCUMENTS

| JP | 2002-511617 A | 4/2002 |
| JP | 2008-186247 A | 8/2008 |
| WO | 99/53427 A | 10/1999 |

OTHER PUBLICATIONS

R. Senaratne, et al., "Optimised Landmark Model Matching for Face Recognition", Proceedings of the 7th International Conference on Automatic Face and Gesture Recognition, 2006.
G.M. Beumer, et al., "A landmark paper in face recognition", Proceedings of the 7th International Conference on Automatic Face and Gesture Recognition, 2006.
T. Amano, et al., "Image Interpolation Using BPLP Method on the Eigenspace", Systems and Computers in Japan, vol. 38, No. 1, 2007.
U.S. Appl. No. 12/901,364, filed Oct. 8, 2010. Applicant: Yoshinori Ito, et al.
U.S. Appl. No. 12/966,725, filed Dec. 13, 2010. Applicant: Takahisa Yamamoto, et al.
U.S. Appl. No. 12/899,387, filed Oct. 6, 2010. Applicant: Masami Kato, et al.

* cited by examiner

*Primary Examiner* — Samir Ahmed
*Assistant Examiner* — Siamak Harandi
(74) *Attorney, Agent, or Firm* — Fitzpatrick, Cella, Harper & Scinto

(57) ABSTRACT

A data correction apparatus which corrects data associated with an image of an object projects vector data obtained by connecting data to be corrected to each other onto a subspace to generate a dimensionally reduced projection vector, and executes dimension restoration processing in which the dimensionality of the projection vector is restored to generate dimensionally restored vector data, thereby generating a plurality of dimensionally restored vector data for each type of fluctuation. The data correction apparatus determines the fluctuation of the object based on the projection vector, integrates the plurality of dimensionally restored vector data with each other based on the determination result, and outputs the integration result as corrected data.

16 Claims, 16 Drawing Sheets

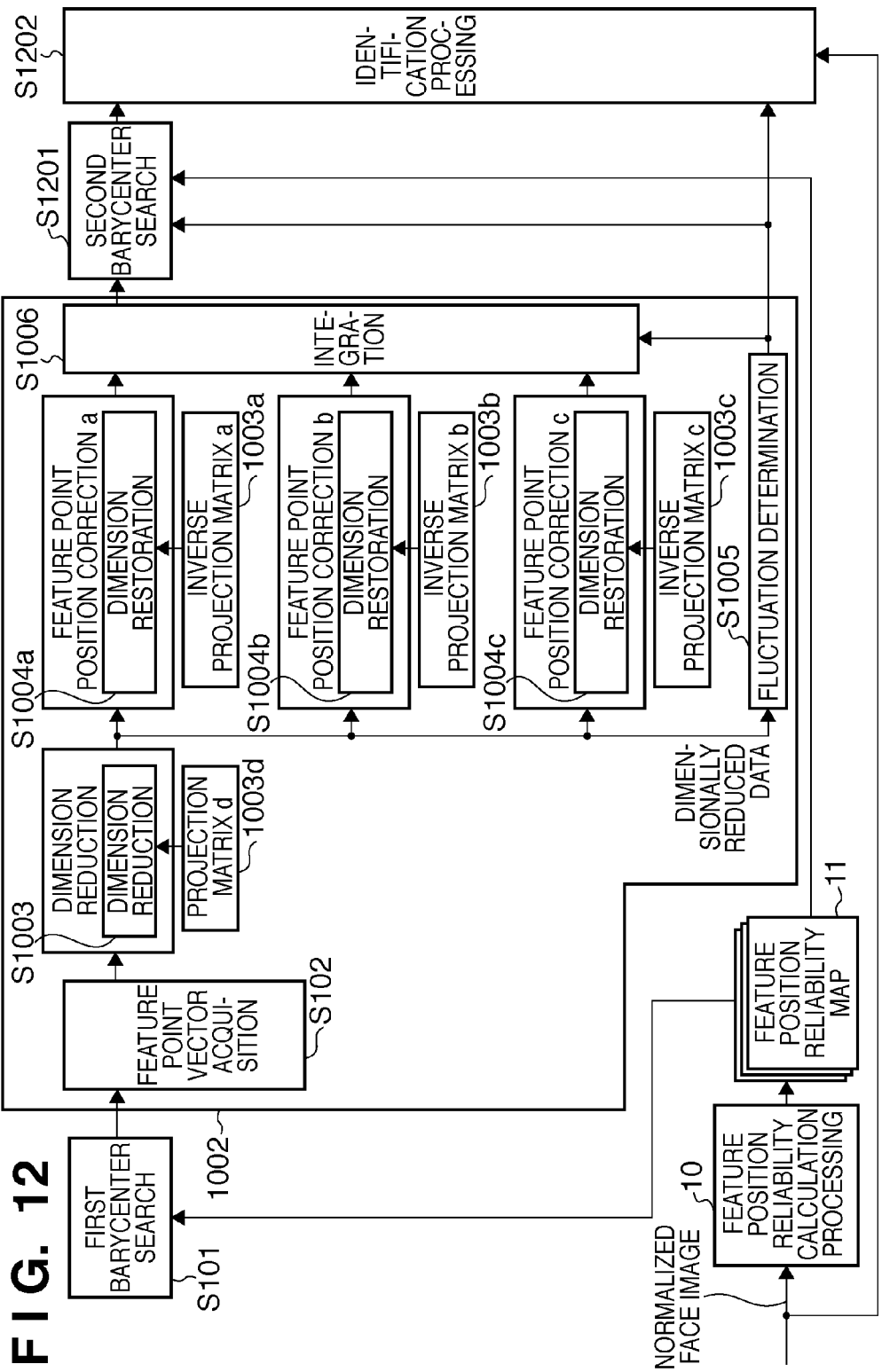

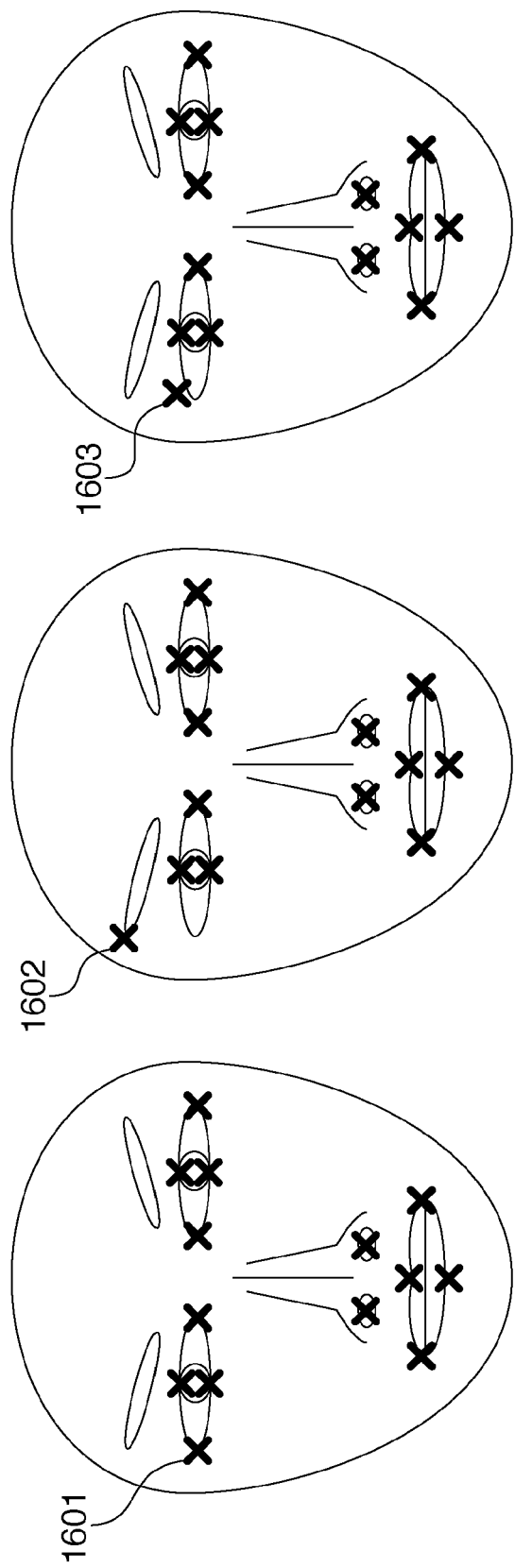

IMAGE DATA CORRECTION APPARATUS AND METHOD USING FEATURE POINTS VECTOR DATA

BACKGROUND OF THE INVENTION

1. Field of the Invention

The present invention relates to a data correction method and apparatus that correct, for example, the position of a feature point or image data for use in, for example, image recognition.

2. Description of the Related Art

In, for example, face recognition that uses image data, decision of the position of a face organ or a characteristic part (to be referred to as a feature point hereinafter) is an important task, which often governs the recognition performance. The decided position of a feature point is used as, for example, a reference point in normalizing the size and rotation of an image to be recognized, and extracting a partial region necessary for recognition from this image. To calculate a feature amount suitable for recognition, it is desirable to precisely decide the position of a feature point.

Japanese PCT National Publication No. 2002-511617 (to be referred to as patent reference 1 hereinafter) describes a technique associated with face detection by graph matching. According to patent reference 1, face detection is executed upon preparing constraints called a plurality of elastic bunch graphs corresponding to the face orientations, and the face orientation and the position of a feature point are decided from the detection result obtained by an optimum elastic bunch graph. R. Senaratne; S. Halgamuge. "Optimized Landmark Model Matching for Face Recognition" Automatic Face and Gesture Recognition, 2006. FGR 2006. 7th International Conference, pp. 120-125 (to be referred to as non-patent reference 1 hereinafter) describes a method of projecting a plurality of feature point position coordinate data onto a dimensionally reduced subspace, and searching the subspace for the position of a feature point. Japanese Patent Laid-Open No. 2008-186247 (to be referred to as patent reference 2 hereinafter) describes a method of determining the face orientation based on an empirically obtained arithmetic expression from the position of a face organ. Beumer, G. M.; Tao, Q.; Bazen, A. M.; Veldhuis, R. N. J. "A landmark paper in face recognition" Automatic Face and Gesture Recognition, 2006. FGR 2006. 7th International Conference, pp. 73-78 (to be referred to as non-patent reference 2 hereinafter) describes a method of setting the coordinate values of each feature point as an input vector, and correcting the position of this feature point using a subspace. An overview of this method will be explained. First, the positions of feature points as shown in FIG. 16A are identified by feature point position candidate decision processing. FIG. 16A shows an example of the positions of feature points and exemplifies a case in which 14 feature points indicated by "×" marks (these feature points are defined as a set of feature points) are decided. For example, a feature point 1601 shown in FIG. 16A corresponds to the tail of the left eye. Next, the coordinate values of each feature point decided in the above-mentioned decision processing are set as an input vector and projected onto a subspace by subspace projection processing. When there are 14 feature points, as shown in FIG. 16A, a 28-dimensional vector (a vector containing 14 horizontal coordinate values and 14 vertical coordinate values as elements) is set as input data. The projection onto the subspace uses a projection matrix generated by, for example, principal component analysis using a plurality of learning feature point position data in advance.

Next, in dimension compression processing, the dimensionality is reduced by eliminating projection values corresponding to projection matrices which are obtained by the principal component analysis and have small eigenvalues. For example, a 28-dimensional vector is reduced to a several-dimensional vector. In subspace inverse projection processing, the input vector projected on the subspace is inversely projected onto a real space to obtain an inverse projection vector in this space using the dimensionally reduced projection vector and the projection matrix. With the foregoing processing, even an input vector with an outlier, which cannot be represented in a subspace, generated using a learning data set, is corrected to a vector which can be represented in the subspace. That is, an input vector is corrected based on a statistical geometric constraint that uses a subspace.

FIG. 16B shows an example in which an erroneous feature point is extracted in the feature point position candidate decision processing. A feature point 1602 exemplifies a feature point, which is erroneously decided as a correct feature point upon erroneously determining the eyebrow edge as the tail of the eye. When the above-mentioned subspace projection processing, dimension reduction processing, and subspace inverse projection processing are executed for an input vector containing the positions of feature points shown in FIG. 16B, the position of the feature point 1602 is corrected to that which can be represented in the subspace. FIG. 16C is a view showing an example of the positions of feature points after the subspace inverse projection processing when the feature point 1602 is corrected to a feature point 1603.

In distance calculation processing, the distance between the feature point candidate coordinates as the output in the feature point position candidate decision processing and the feature point coordinates corrected by a series of processing from the subspace projection processing to the subspace inverse projection processing is calculated for each feature point. In the case exemplified in FIGS. 16B and 16C, the Euclid distance between the feature points 1602 and 1603 in the image coordinate system is calculated. In selection processing, the distance of the feature point calculated in the distance calculation processing is compared with a threshold, and the coordinates of the feature point before or after the correction are selected for each feature point. In this case, the coordinate values after the correction are selected if the distance between the feature points before and after the correction exceeds a predetermined threshold, and those before the correction are selected if that distance is equal to or smaller than the threshold. The foregoing processing is repeated for each feature point. Also, re-execution of a series of processing from the subspace projection processing to the selection processing upon setting the set of feature points obtained as a result of the selection processing as an input vector is repeated a plurality of times, thereby deciding appropriate positions of the feature points.

Moreover, Toshiyuki Amano, Yukio Sato, "Image Interpolation Using BPLP Method on the Eigenspace" IEICE Trans. Vol. J85-D2, No. 3, pp. 457-465 (to be referred to as non-patent reference 3 hereinafter) describes a technique of processing and appropriately correct image data based on the same concept as in non-patent reference 2. Non-patent reference 3 describes a method of statistically interpolating defective data by projecting image data itself onto a low-dimensional subspace.

The method described in patent reference 1 requires a large amount of computation because the degree of matching between deformation of the elastic bunch graph and the feature amount is iteratively computed for each face orientation until the face is ultimately detected. Non-patent reference 1 searches the subspace for the position of a feature point using the particle swarm optimization method, thereby determining the position of a feature point with high accuracy although the method in this reference requires a smaller amount of computation than in that described in patent reference 1. Nevertheless, the method described in non-patent reference 1 still requires a large amount of computation because it is necessary to repeat decision of an organ position candidate and extraction of a feature amount at a position corresponding to this candidate. Also, the method described in non-patent reference 1 does not take into consideration a mechanism which copes with a large fluctuation of the face. Patent reference 2 describes a method of determining the face orientation based on a rule empirically obtained from the arrangement of organ positions. It is possible to determine and correct an error of the organ position detected as a candidate based on the arrangement of organ positions using the technique in patent reference 2. However, it is difficult to set a rule optimum for various types of fluctuations in the rule-based determination processing.

The geometric correction processing using a subspace, which is described in non-patent reference 2, is effective in allowing appropriate geometric constraint processing with a small amount of computation, but does not take into consideration the situation in which the face orientation/facial expression has large fluctuations. When a data group with a large fluctuation is added to the learning data of the subspace in order to cope with the fluctuations, the correction capability degrades. Similarly, non-patent reference 3 does not take into consideration the situation in which the target image has a large fluctuation.

SUMMARY OF THE INVENTION

The present invention has been made in consideration of the above-mentioned problems and, according to its one embodiment, provides a data correction apparatus and method which appropriately correct the position of a feature point or image data even if the object has a large fluctuation.

According to one aspect of the present invention, there is provided a data correction apparatus which corrects data associated with an image of an object, comprising: an input unit configured to input vector data obtained by connecting data to be corrected to each other; a generation unit configured to execute dimension reduction processing in which the vector data is projected onto a subspace to generate a dimensionally reduced projection vector, and dimension restoration processing in which a dimensionality of the projection vector is restored to generate dimensionally restored vector data, thereby generating a plurality of dimensionally restored vector data for each type of fluctuation of the object in the image; a determination unit configured to determine the fluctuation of the object based on the projection vector; and an integration unit configured to integrate the plurality of dimensionally restored vector data with each other based on the determination result obtained by the determination unit, and outputting the integration result as corrected data.

Furthermore, according to another aspect of the present invention, there is provided a method of controlling a data correction apparatus which corrects data associated with an image of an object, comprising: an input step of causing input means to input vector data obtained by connecting data to be corrected to each other; a generation step of causing generation means to execute dimension reduction processing in which the vector data is projected onto a subspace to generate a dimensionally reduced projection vector, and dimension restoration processing in which a dimensionality of the projection vector is restored to generate dimensionally restored vector data, thereby generating a plurality of dimensionally restored vector data for each type of fluctuation of the object in the image; a determination step of causing determination means to determine the fluctuation of the object based on the projection vector; and an integration step of causing integration means to integrate the plurality of dimensionally restored vector data with each other based on the determination result obtained in the determination step, and outputting the integration result as corrected data.

Further features of the present invention will become apparent from the following description of exemplary embodiments with reference to the attached drawings.

BRIEF DESCRIPTION OF THE DRAWINGS

FIG. 12 is a flowchart for explaining position correction processing according to the fourth embodiment;

FIGS. 16A to 16C are views for explaining detection of feature points from a face image.

DESCRIPTION OF THE EMBODIMENTS

Preferred embodiments of the present invention will be described below with reference to the accompanying drawings.

First Embodiment

Figure 2:
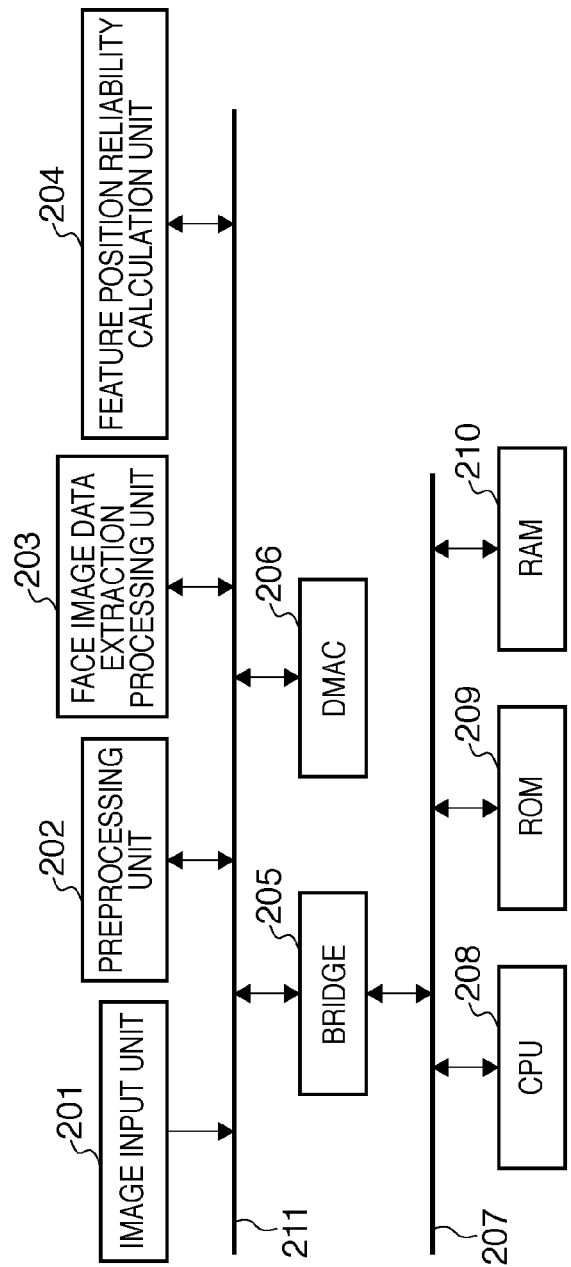
FIG. 2 is a block diagram showing an example of the configuration of an image processing apparatus according to each of the first to fifth embodiments.

FIG. 2 is a block diagram showing the configuration of an image processing apparatus which can execute image processing (data correction processing) according to the first embodiment. The image processing apparatus according to this embodiment has a function of deciding a plurality of feature point positions in a face image (the positions of features associated with respective organs of a face in this case).

An image input unit 201 includes, for example, an optical system, a photoelectric conversion device, a driver circuit which controls them, an A/D converter, a signal processing circuit which controls various types of image correction, and a frame buffer. Examples of the photoelectric conversion device include CCDs (Charge-Coupled Devices) and CMOS (Complementary Metal Oxide Semiconductor) sensors. A preprocessing unit 202 executes various types of preprocessing in order to effectively perform various types of processing in subsequent stages. More specifically, the preprocessing unit 202 executes, by hardware, image data conversion such as color conversion processing/contrast correction processing for image data acquired by the image input unit 201. A face image data extraction processing unit 203 executes face detection processing for the image data corrected by the preprocessing unit 202. A variety of conventionally proposed methods are applicable to the face detection. Moreover, the face image data extraction processing unit 203 normalizes the face image data to have a predetermined size and extracts this data for each detected face. In this case, image data having its size and in-plane rotation normalized is generated using the face detection result.

Figure 3:
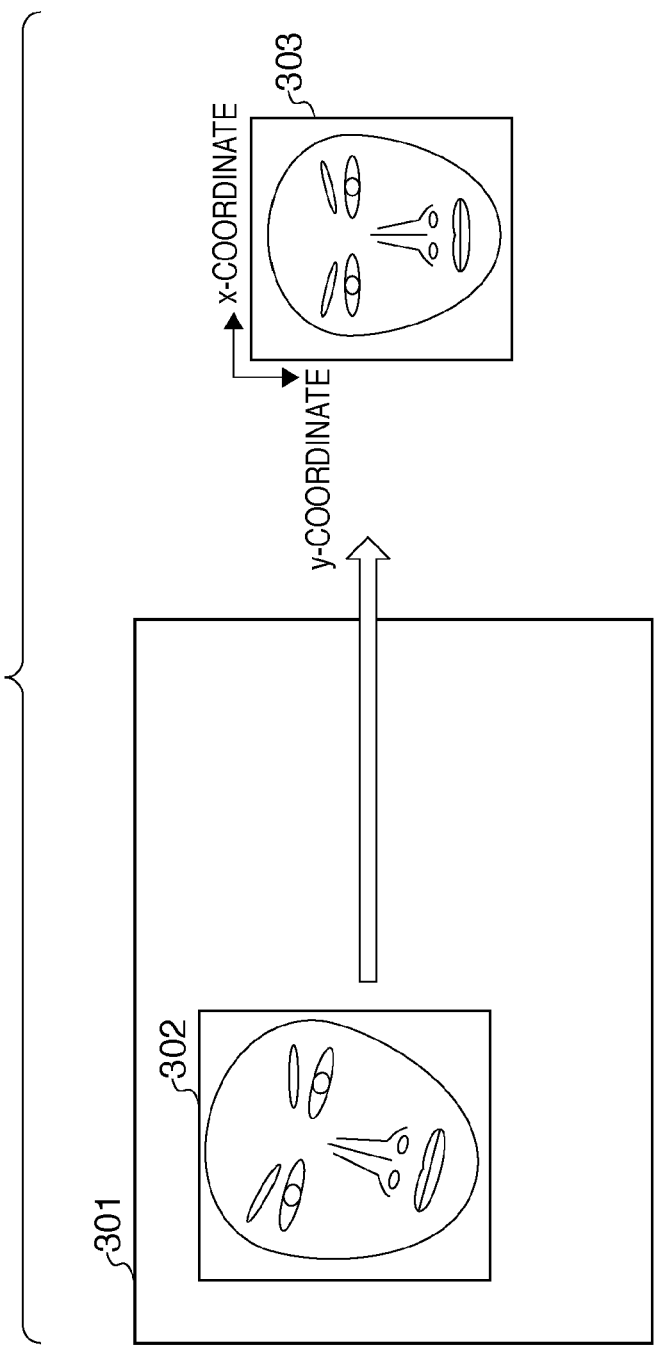
FIG. 3 is a view for explaining face image extraction.

FIG. 3 is a view for explaining an example of face image data extraction processing. A face region 302 is determined from image data 301 corrected by the preprocessing unit 202 to extract face image data 303 normalized to have a predetermined size. The size of the face image data 303 becomes constant upon normalization. The position of a feature point will be defined as the coordinates of a feature point within the image plane of the face image data 303 hereinafter. Also, these coordinates will be represented in a coordinate system (x- and y-coordinates) which uses the upper left end of the image plane of the face image data 303 as its origin.

A feature position reliability calculation unit 204 is a processing unit which calculates a reliability map serving as information indicating the likelihood of existence of a feature point. Details of the feature position reliability calculation unit 204 will be described later. A DMAC 206 controls, for example, data transfer among the respective types of processing units on an image bus 211 and among the devices on the image bus 211 and a RAM 210/ROM 209 on a CPU bus 207. Note that DMAC is an abbreviation for Direct Memory Access Controller, RAM is an abbreviation for Random Access Memory, and ROM is an abbreviation for Read Only Memory. A bridge 205 provides a bus bridge function between the image bus 211 and the CPU bus 207. A CPU (Central Processing Unit) 208 executes the main processing according to this embodiment, and controls the overall operation of the apparatus. Each operation to be described later is performed by executing, by a computer (CPU 208), a computer program stored in a computer-readable storage medium such as the ROM 209. The ROM 209 stores commands which define the operations of the CPU 208. The RAM 210 is a working memory necessary to operate the CPU 208. The RAM 210 is configured as a memory with a relatively large capacity using, for example, a DRAM (Dynamic RAM). The CPU 208 can access the respective types of processing units on the image bus 211 via the bridge 205. The respective processing units 201, 202, 203, and 204 and the CPU 208 can be simultaneously operated by hardware by separating the image bus 211 and the CPU bus 207 from each other.

Figure 1:
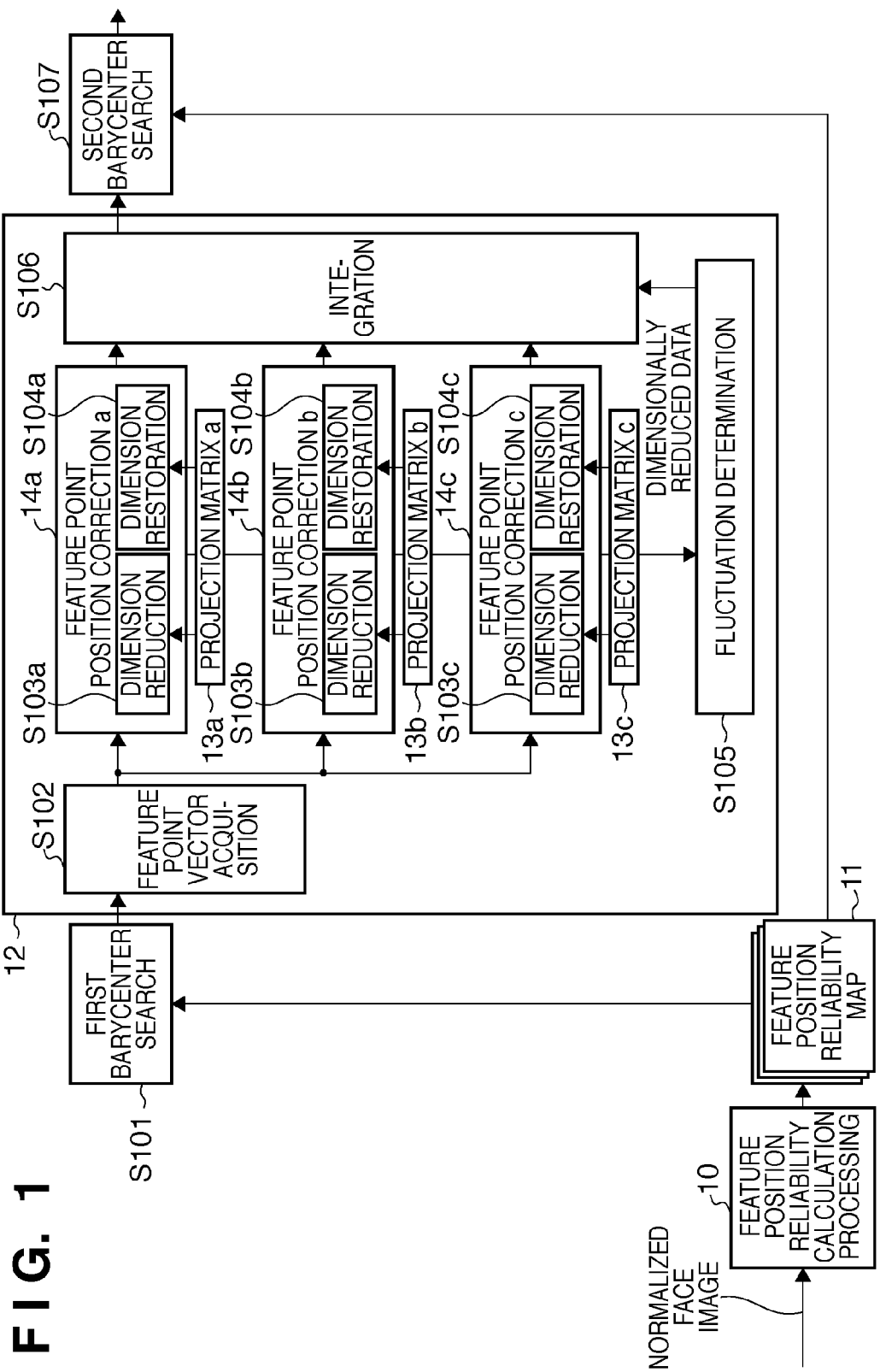
FIG. 1 is a flowchart for explaining position correction processing according to the first embodiment.

Image processing (data correction processing) by the image processing apparatus according to the first embodiment with the foregoing configuration will be described with reference to a flowchart shown in FIG. 1. Referring to FIG. 1, steps S101 to S107 are processed by the CPU 208. In feature position reliability calculation processing 10, the face image data extraction processing unit 203 stores face image data, normalized to have a predetermined size based on the face detection result, in a built-in RAM (not shown). The stored face image data is transferred to a RAM (not shown) of the feature position reliability calculation unit 204 via the DMAC 206. The feature position reliability calculation unit 204 starts to calculate a reliability image indicating the reliabilities, that is, the likelihoods of existence of feature point position candidates for the image data stored in the RAM. The reliability image generated at this time is defined as a feature position reliability map 11 (to be also referred to as a reliability map hereinafter). A variety of conventionally proposed methods are applicable to the reliability calculation. As a simplest method, a template which represents a feature of a corresponding feature point is generated by learning, and the degree of matching between the template and an image of the target position is determined as the reliability.

Figure 4:
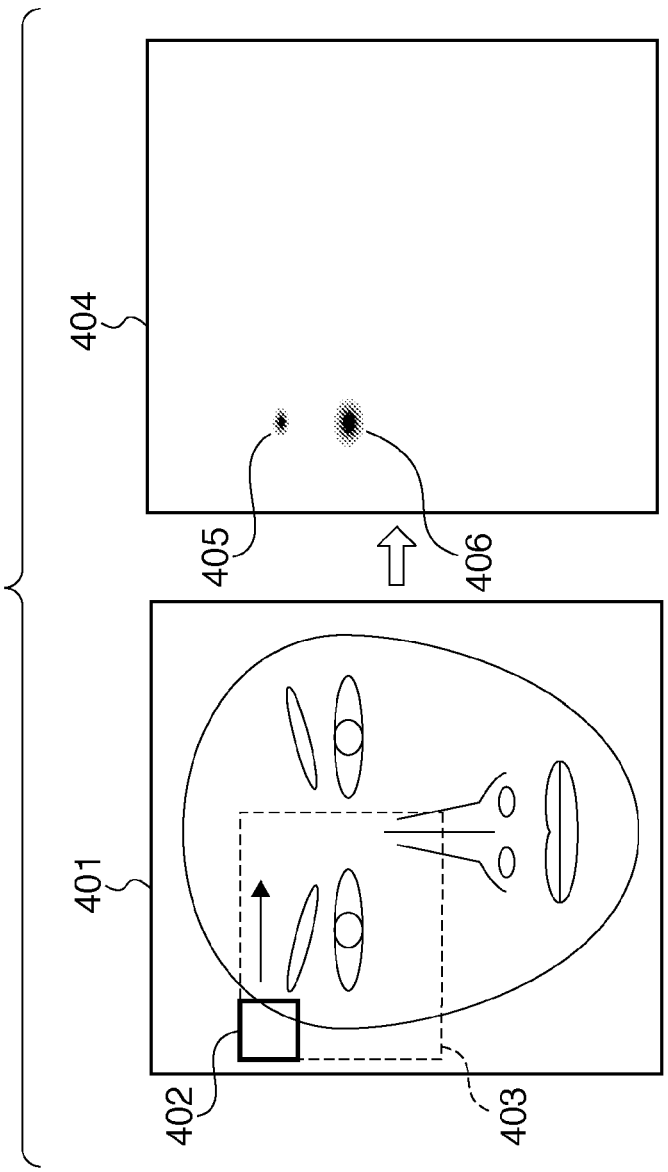
FIG. 4 is a view for explaining reliability map generation processing.

FIG. 4 is a view for schematically explaining reliability map generation. Reference numeral 401 denotes an input image. Reference numeral 402 denotes a template for template matching; and 403, a predetermined range across which template matching is executed. The template 402 is scanned within the predetermined range 403 to record the degree of matching with the template at the target position, thereby generating a reliability map 404. That is, the reliability map is a buffer memory which records the reliability in place of image data. A sufficiently wide region including an endpoint to be detected is set as the predetermined range 403 in consideration of, for example, individual differences in personal characteristic, facial expressions, face orientations, and normalization errors of the face image data extraction processing unit 203.

Reference numeral 404 schematically exemplifies a reliability map, which corresponds to the reliability map 11. Reference numerals 405 and 406 denote the positions which are highly reliably expected to be a feature point position to be detected (which have high degrees of matching with the template in this case). FIG. 4 shows the result of matching with the template 402 used to detect the endpoint of the tail of the left eye. Also, reference numeral 406 denotes a target endpoint; and 405, a point corresponding to the left edge of the eyebrow, which is erroneously detected as the target endpoint. The feature position reliability calculation unit 204 generates a reliability map for each feature point. Hence, to decide, for example, 14 feature points shown in FIG. 16A, 14 reliability maps 11 are generated using 14 types of feature point detection templates. Note that a method of holding only a region corresponding to the scanning range 403 in a memory as the reliability map 11 may be adopted. Note also that although a method of calculating the reliability by template matching has been described herein, a variety of conventionally proposed pattern identification methods such as a neural networking method and a cascade filtering method are available.

The generated reliability map 11 is transferred to the RAM 210 via the DMAC 206. After the transfer is completed, the CPU 208 starts feature point position decision operations (steps S101 to S107). Thereafter, the CPU 208 continues the processing by referring to the reliability map 11 stored in the RAM 210. In first barycenter search processing (S101), the barycenter of the feature point position reliability value within the search region 403 in the feature position reliability map 11 is calculated for each feature point. The barycenter values obtained at this time are set as feature point position candidate coordinates. The barycenter is searched for, for each feature point. A commonly known method may be applied to the barycenter search. Other methods such as the use of a maximum value in place of a barycenter may also be adopted. The CPU 208 records the calculated barycenter position coordinates in the RAM 210.

Feature point position correction processing 12 for correcting the feature point position candidate coordinates obtained at this time to more appropriate values will be described next. In this embodiment, feature point position correction processes 14a, 14b, and 14c are prepared as geometric correction processing for each face orientation, and the respective correction results are integrated (S106) in accordance with the result of fluctuation determination processing (S105) associated with the face orientation. Thus, correction processes corresponding to a plurality of types of fluctuations (for example, three fluctuations corresponding to the front, right, and left face orientations, respectively) are integrated. The feature point position correction processes 14a, 14b, and 14c use subspaces and are dedicated to the arrangements of feature points corresponding to the front, right, and left face orientations, respectively. That is, projection matrices a, b, and c, that is, 13a to 13c are calculated by principal component analysis using large numbers of learning feature point vectors corresponding to the front, right, and left face orientations (these projection matrices also include average vectors). The learning feature point vectors are obtained from feature points at correct coordinates. Note that a projection matrix in a broad sense will be described hereinafter using a projection matrix in a narrow sense and an average vector.

Figure 5:
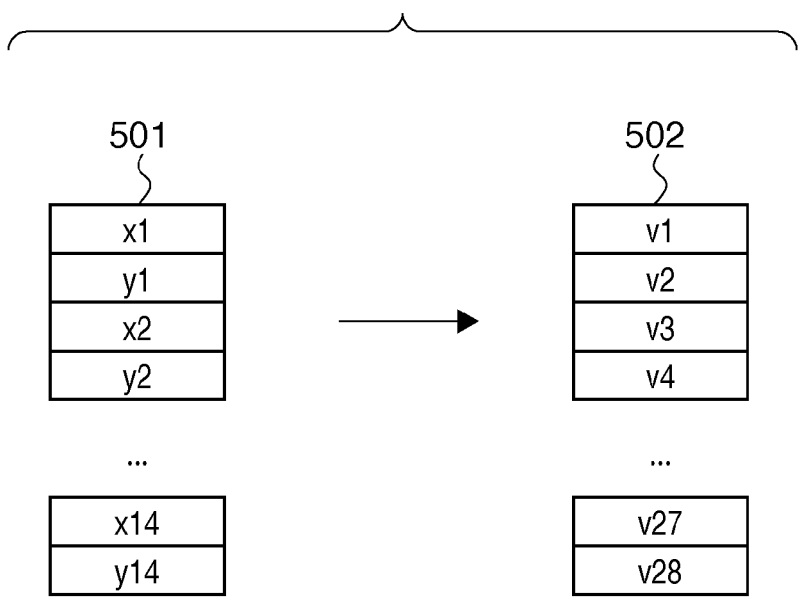
FIG. 5 is a view for explaining the relationship between the feature data and the feature point vector.

First, in feature point vector acquisition processing (S102), the coordinate data of each feature point as the barycenter search result is extracted from the RAM 210 to generate feature point vector data. FIG. 5 is a view for explaining the relationship between position coordinate data 501 (($x_i,y_i$) for i=1 to 14)) of each feature point and a feature point vector 502 (vector V (element $v_j$ for j=1 to 28)) extracted at this time. i is the number of feature points and is 14 in this case. Then, the feature point vector has i×2=28 dimensions. In this manner, data to be corrected are connected to each other and thereby vectorized to generate vector data. For example, the elements $v_1$ and $v_2$ of the feature point vector correspond to the x- and y-coordinate values, respectively, of the first feature point. The feature point vector V is defined by:

$$V=(v_1, v_2, v_3, \ldots, v_{2\times f})^T \quad (1)$$

where f is the number of feature points.

In dimension reduction processing (S103a), a projection vector is generated using the projection matrix a (which also includes an average vector), that is, 13a. Using a vector generated by subtracting an average vector $A_a$ (28-dimensional vector) generated from the feature point vector V upon projection matrix generation, and a projection matrix $E_a$ (note that the projection matrix $E_a$ and the average vector $A_a$ are calculated by principal component analysis using a large number of learning feature point vectors corresponding to the front-facing face), a projection vector $P_a$ is calculated in accordance with:

$$P_a = E_a^T(V-A_a) \quad (2)$$

$$A_a = (A_{a,1}, A_{a,2}, A_{a,3}, \ldots, A_{a,2\times f})^T \quad (3)$$

$$E_a = (u_{a,1}, u_{a,2}, \ldots, u_{a,p}) \quad (4)$$

where $u_{a,1}, u_{a,2}, \ldots, u_{a,p}$ are the 2×f-dimensional normalized orthogonal vectors, respectively, which are obtained by principal component analysis, and are 28-dimensional vectors, respectively, in this embodiment; and p is the dimensionality of the projection vector and is six in this embodiment. That is, the projection matrix $E_a$ is generated by selecting six vectors in descending order of corresponding eigenvalue from the orthogonal vectors obtained by principal component analysis. The projection matrix $E_a$ and the average vector $A_a$ are stored in, for example, the ROM 209 or RAM 210 in advance.

As described above, in the dimension reduction processing (S103a), a 2×f-dimensional feature point vector is dimensionally reduced to a p-dimensional projection vector. With this dimension reduction processing (S103a), the feature point vector is projected onto a subspace which represents the front-facing face. The CPU 208 stores the calculated projection vector in the RAM 210.

In dimension restoration processing (S104a), data on the feature point vector of the original dimensions (that is, the coordinate position) is restored from the projection vector $P_a$. Using the projection matrix $E_a$ and average vector $A_a$ mentioned above, a restored vector $V_a'$ is calculated in accordance with:

$$V_a' = E_a P_a + A_a \quad (6)$$

The restored vector $V_a'$ generated by inverse projection is data in the format of the feature point vector 502 shown in FIG. 5, and therefore can be associated with the coordinate data stream 501, like the vector data acquired in the feature point vector acquisition processing (S102).

Similarly, in steps S103b and S104b, projection onto a subspace (corresponding to equation (2)) and inverse projection (corresponding to equation (6)) are executed using the projection matrix b, that is, 13b (a projection matrix $E_b$ and an average vector $A_b$) calculated from a plurality of learning feature point vectors corresponding to the right-facing face. With this processing, a geometric correction processing result $V_b'$ corresponding to the right-facing face is obtained. Similarly again, in steps S103c and S104c, projection onto a subspace (corresponding to equation (2)) and inverse projection (corresponding to equation (6)) are executed using the projection matrix c, that is, 13c (a projection matrix $E_c$ and an average vector $A_c$) calculated from a plurality of learning feature point vectors corresponding to the left-facing face. With this processing, a geometric correction processing result $V_c'$ corresponding to the left-facing face is obtained. Thus, a plurality of dimensionally restored vector data are acquired for each type of fluctuation of the object.

In fluctuation determination processing (S105), a fluctuation in face orientation is estimated from the projection vectors. In this case, that fluctuation is estimated using the projection vector $P_a$ and projection vectors $P_b$ and $P_c$, which are calculated in the dimension reduction processing (S103a to S103c). That is, various types of fluctuations are discriminated from each other by identifiers, which are constructed by learning in advance by setting elements of each of the projection vectors $P_a$, $P_b$, and $P_c$ as input data. The fluctuation determination is performed by identifiers that have learned using SVMs (Support Vector Machines). The identifier learns by means of projection vectors, generated using a large number of feature point vector data corresponding to the face orientation in advance, as teacher data. Learning feature point vector data used in generating the projection matrices a to c, that is, 13a to 13c, for example, may be used as teacher data. The identification processing is performed for dimensionally compressed projection vectors, and therefore can be realized with a small amount of computation.

Figure 7:
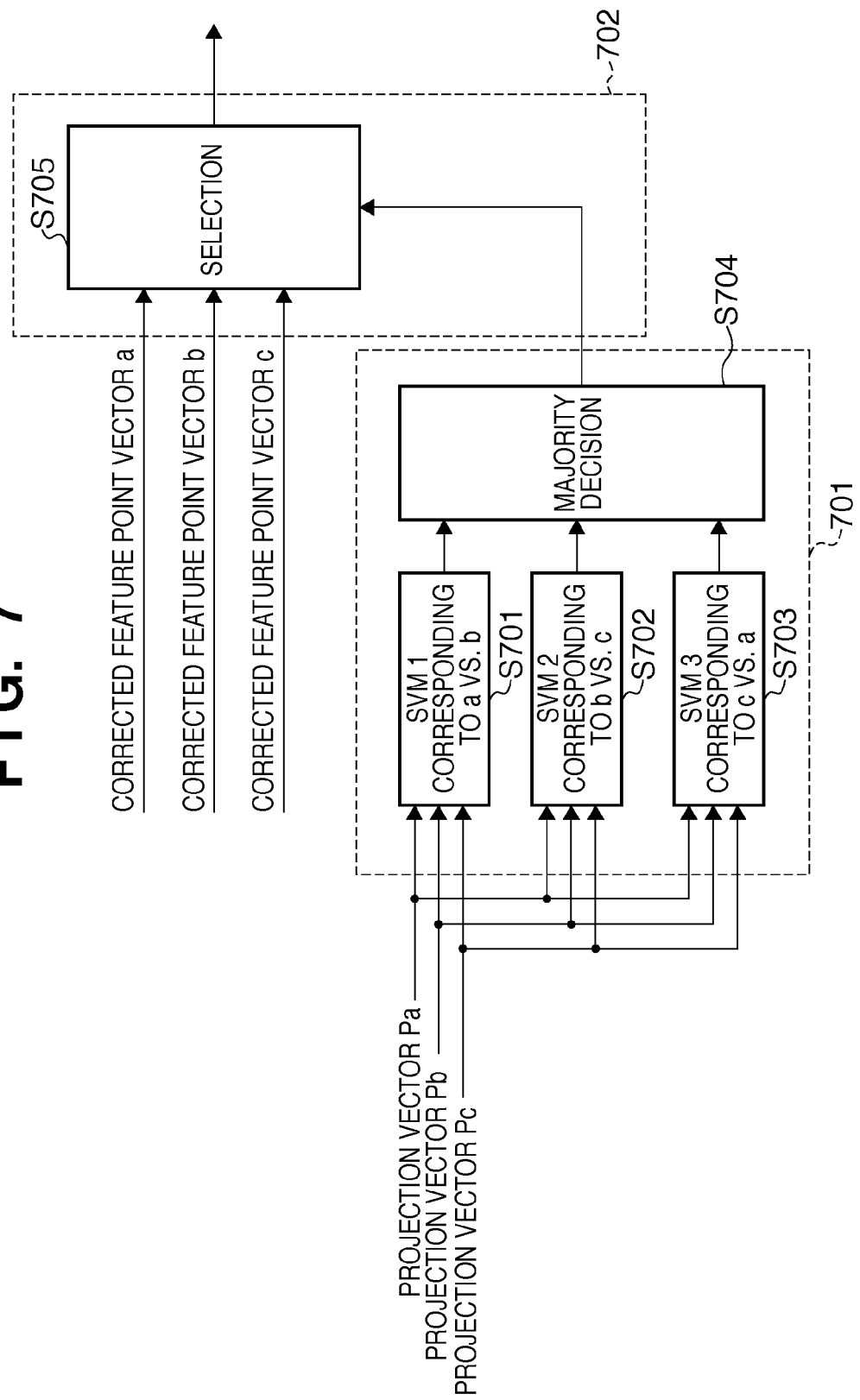
FIG. 7 is a flowchart for explaining fluctuation determination processing and integration processing according to the first embodiment.

The fluctuation determination processing (S105) and the integration processing (S106) will be described next with reference to FIG. 7. Reference numeral 701 denotes the fluctuation determination processing (S105). Steps S701 to S703 correspond to SVM identification computation processing, and identification processing computation is executed for a vector D generated by simply connecting the projection vectors $P_a$, $P_b$, and $P_c$ to each other. That is, in steps S701 to S703, the CPU 208 reads out the projection vectors stored in the RAM 210 in the dimension reduction processing (S103a to S103c) to execute their SVM computation described by:

$$(\text{Determination Result})_n = \text{sign}(W_n^T D - h) \quad (7)$$

where $W_n^T = (w_{n,1}, w_{n,2}, \ldots, w_{n,p \times 3})$, h is a threshold, and n is 1 to 3 (corresponding to SVM identifiers 1 to 3, respectively), and "sign" is a sign determined by a sign determination device.

Equation (7) describes a linear SVM, and $W_n$ is a weighting factor learned by the SVM in advance. The weighting factor is a weighting factor vector having factors for elements, the number of which is equal to "(the number of dimensions)× (the number of fluctuations)", of the projection vector. $W_1$ is a weighting factor used to determine whether the face orientation is the front or the right. Similarly, $W_2$ is a weighting factor used to determine whether the face orientation is the right or the left, and $W_3$ is a weighting factor used to determine whether the face orientation is the left or the front. In step S701, it is determined using the weighting factor $W_1$ whether the face orientation is the front (a) or the right (b). Similarly, in steps S702 and S703, it is determined using the weighting factors $W_2$ and $W_3$ whether the face orientation is the right (b) or the left (c) and the left (c) or the front (a), respectively. In majority decision processing (S704), the final face orientation is decided from the result of the SVM identification computation processing (S701 to S703). Note that the fluctuation determination processing (S105) is not limited to the method described in this embodiment, and identification methods other than SVMs are also applicable to this processing.

Reference numeral 702 denotes the integration processing (S106). In the integration processing, a corresponding one of corrected feature point vectors a to c is selected (S705) in accordance with the result of the majority decision processing (S704). That is, if it is determined in the fluctuation determination processing (S105) that the face orientation is the right, the result of inverse projection processing corresponding to the right-facing face, that is, the dimension restoration processing S104b is selected. In this manner, the inverse projection results are integrated with each other based on the fluctuation determination result, and therefore can be efficiently, appropriately integrated with each other in accordance with the input image.

Although one inverse projection result is selected in the integration processing (S106) herein, other methods may be adopted. When, for example, the determination reliabilities are output in the SVM identification processing (S701 to S703), a method of obtaining a final corrected feature point vector $P_{result}$ by:

$$P_{result} = (C_1 \times P_a + C_2 \times P_b + C_3 \times P_c) / (C_1 + C_2 + C_3) \quad (8)$$

where $C_1$ to $C_3$ are the reliabilities, may also be adopted.

That is, the final geometric correction result may be generated by performing a weighted average method for a plurality of dimension restoration results using the reliabilities.

Figure 6:
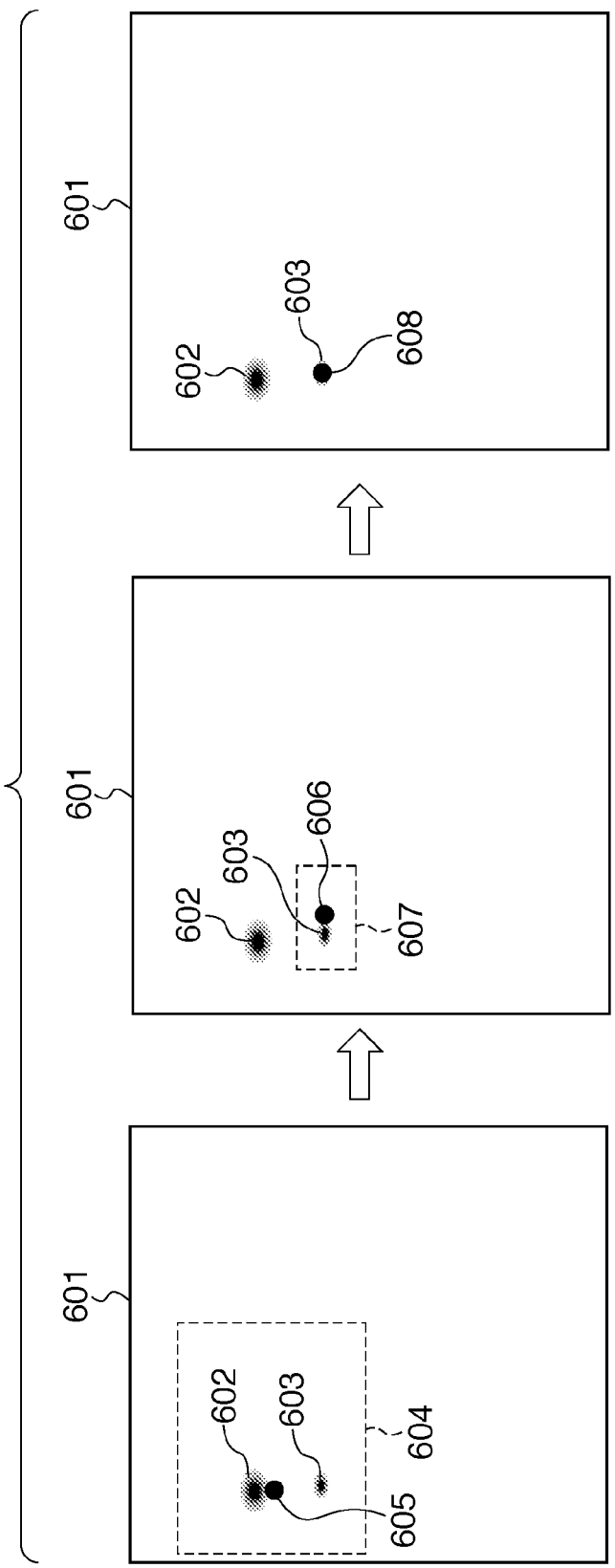
FIG. 6 is a view for explaining first barycenter search processing and second barycenter search processing.

Referring back to FIG. 1, in second barycenter search processing (S107), the CPU 208 searches for a feature point position again based on the obtained geometric correction position coordinate data. An example of search of the reliability map for a feature point position will be described with reference to FIG. 6. Referring to FIG. 6, reference numeral 601 denotes a reliability map for a certain feature point. Reference numeral 604 exemplifies the search range in the first barycenter search processing (S101). A wide region is set as the search range in the first barycenter search processing in order to cope with, for example, individual differences in personal characteristic and fluctuations of the face. Reference numeral 603 denotes the distribution of reliability for the target feature; and 602, the distribution of reliability generated upon erroneous detection. When a barycenter is determined to fall within the search range 604, a feature point candidate has coordinates which deviate from the original values, as denoted by reference numeral 605. Reference numeral 606 denotes a candidate point coordinate position after geometric correction (the output obtained by the integration processing (S106)). In the second barycenter search processing (S107), a barycenter which falls within a narrow range denoted by reference numeral 607 is calculated using the candidate point coordinate position 606 after correction as its center. In this case, the erroneous detection region 602 falls outside the search region, so the original position denoted by reference numeral 608 is determined as a final organ position.

As described above, according to the first embodiment, the selective/integrated use of a subspace prepared for each type of fluctuation makes it possible to correct feature point positions based on the geometric arrangement of organ positions even if the object has various types of fluctuations. Also, the use of projection vectors onto subspaces makes it possible to efficiently, effectively estimate fluctuations of the object with a small amount of computation.

Second Embodiment

Figure 8:
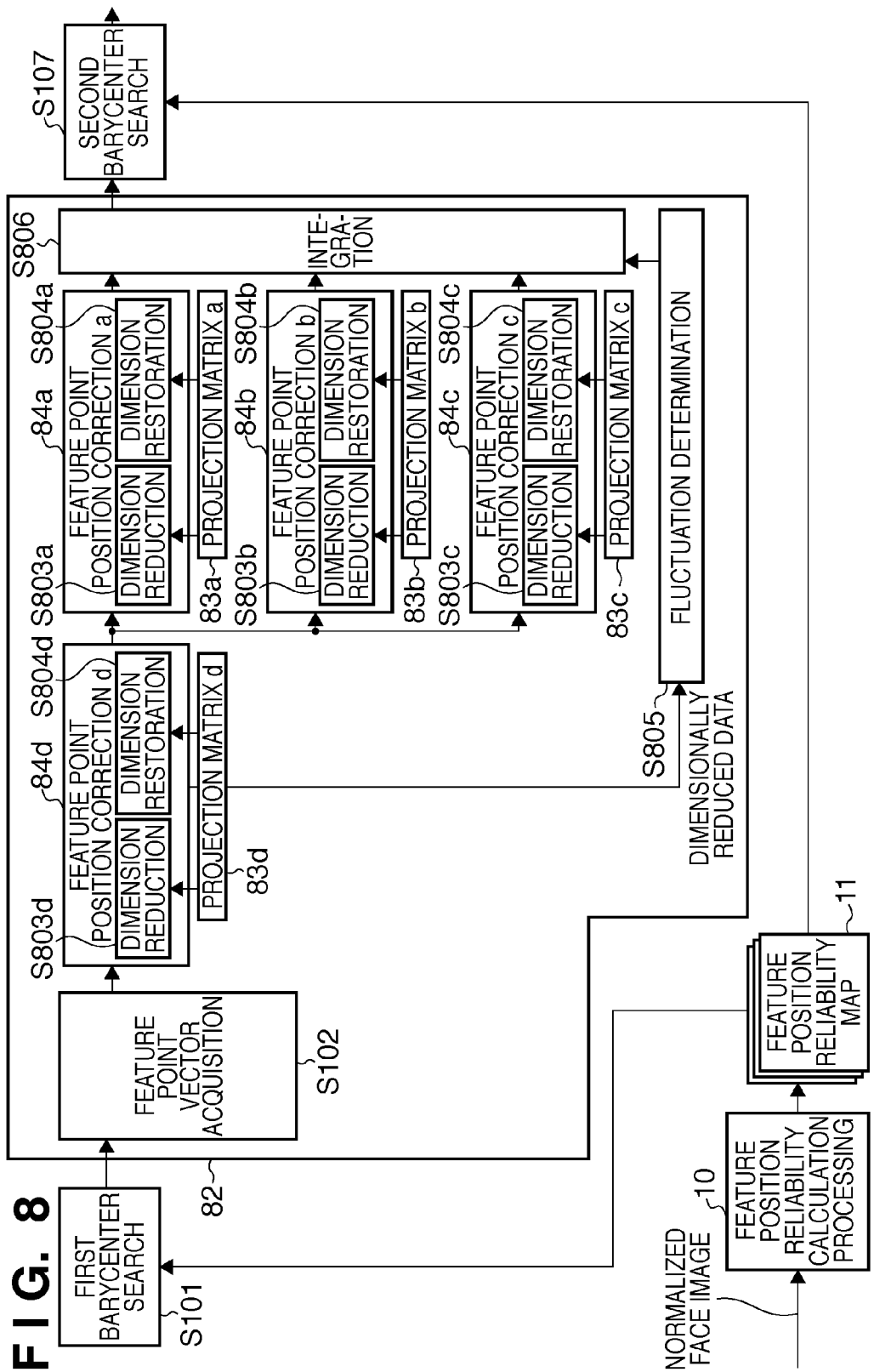
FIG. 8 is a flowchart for explaining position correction processing according to the second embodiment.
Figure 9:
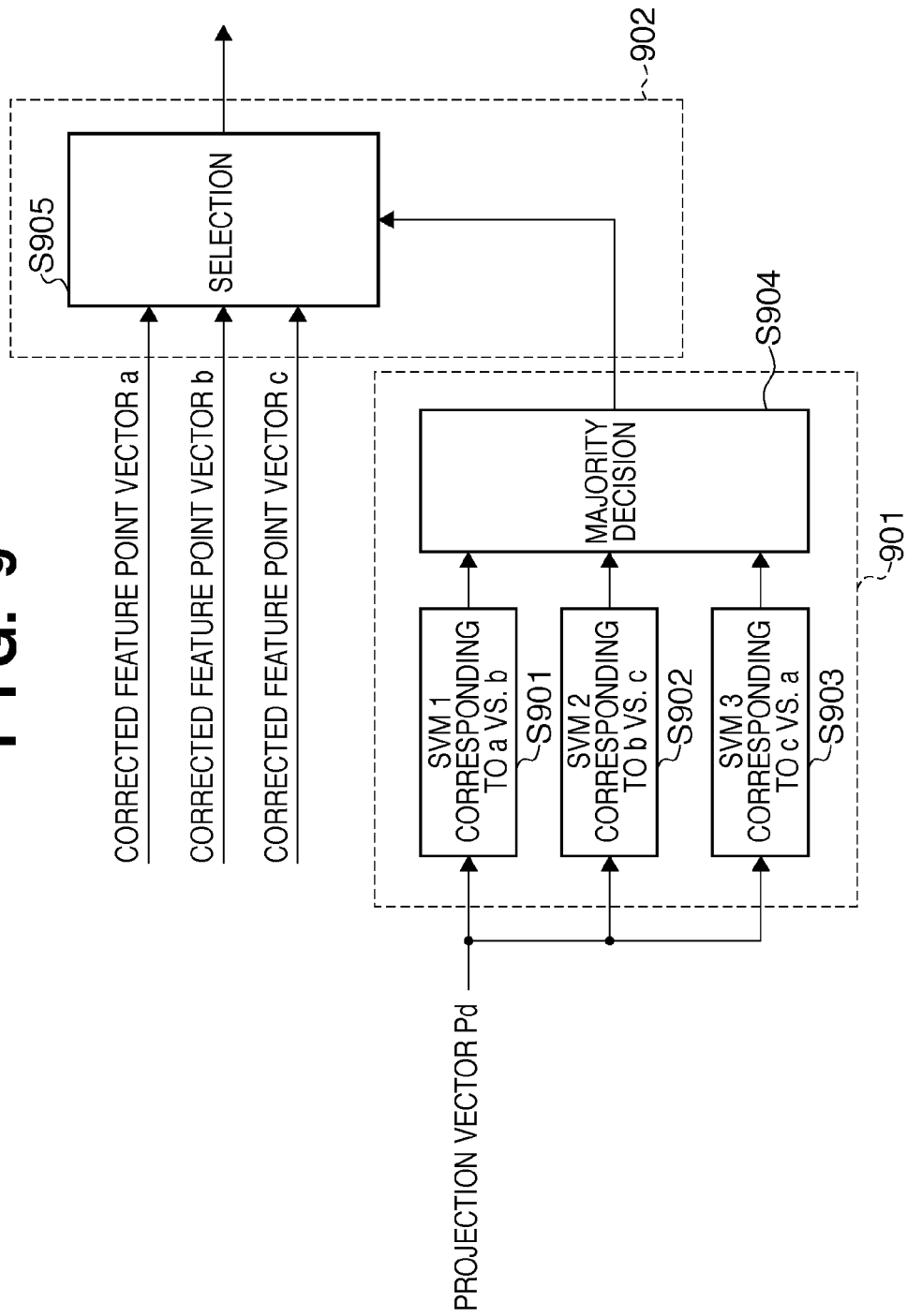
FIG. 9 is a flowchart for explaining fluctuation determination processing and integration processing according to the second embodiment.

The second embodiment will be described below with reference to FIGS. 8 and 9. An image processing apparatus according to the second embodiment has the same configuration as in the first embodiment (FIG. 2), and provides a function of deciding a plurality of feature point positions in a face image. The same reference numerals as in the first embodiment (FIG. 1) denote the same configurations in FIG. 8. Differences of the second embodiment from the first embodiment will be mainly explained below. In feature point position correction processing 82, feature point position correction processing according to the second embodiment is executed to correct each feature point position candidate calculated in first barycenter search processing (S101). A CPU 208 processes all of steps S101, S102, S803 to S806, and S107.

In the feature point position correction processing 82 according to this embodiment, first, a feature point position correction process 84d based on projection onto a subspace containing all types of fluctuations (to be defined as a common subspace hereinafter) is executed. Next, feature point position correction processes 84a to 84c based on projection onto fluctuation-specific subspaces are executed for the result of the feature point position correction process 84d, and their results are integrated by integration processing (S806). Fluctuation determination processing (S805) is executed using the projection vector obtained upon computation associated with the feature point position correction process 84d based on the projection onto the common subspace. In the integration processing (S806), the results of the feature point position correction processes 84a to 84c are integrated using the determination result obtained by the fluctuation determination processing (S805). Each step will be described in detail below.

In feature point vector acquisition processing (S102), the CPU 208 extracts the position coordinate data of each feature point stored in a RAM 210 as a feature point vector. The structure of the feature point vector is the same as in the first embodiment. In first dimension reduction processing (S803d), the CPU 208 uses a first projection matrix 83d including a projection matrix $E_d$ and an average vector $A_d$ (note that the projection matrix $E_d$ and the average vector $A_d$ are calculated in advance by principal component analysis using a large number of learning feature point vectors containing all types of fluctuations to be determined. The projection matrix generation method is the same as in the first embodiment, except for the type of learning feature point data. In this case, a large number of learning feature point position coordinate data containing fluctuations corresponding to the front, right, and left face orientations are used) to calculate a first projection vector $P_d$ as a function of a feature point vector V in accordance with:

$$P_d E_d^T (V - A_d) \qquad (9)$$

$$A_d = (A_{d,1}, A_{d,2}, A_{d,3}, \ldots, A_{d,2 \times f})^T \qquad (10)$$

$$E_d = (u_{d,1}, u_{d,2}, \ldots, u_{d,p}) \qquad (11)$$

where $u_{d,1}, u_{d,2}, \ldots, u_{d,p}$ are the 2×f-dimensional normalized orthogonal vectors, respectively, which are obtained by principal component analysis, and are 28-dimensional vectors, respectively, in this embodiment; and p is the dimensionality of the projection vector $P_d$ and is six in this embodiment. The method of selecting normalized orthogonal vectors obtained by principal component analysis is the same as in the first embodiment. The projection matrix $E_d$ and the average vector $A_d$ are stored in a ROM 209 or the RAM 210 in advance. The CPU 208 stores the computation result of equation (9) in the RAM 210.

In first dimension restoration processing (S804d) in which the first projection vector is dimensionally restored, the CPU 208 uses the projection matrix $E_d$ and the average vector $A_d$ to execute dimension restoration processing described by:

$$V_d' = E_d P_d + A_d \qquad (12)$$

With the dimension reduction processing (S803d) and the dimension restoration processing (S804d), a corrected feature point vector based on the projection onto the common subspace is generated. Any large outliers are removed by the correction processing at this time, thereby making it possible to enhance the stability of the subsequent feature point position correction processes 84a to 84c.

Feature point position correction processes a to c, that is, 84a to 84c are equivalent to the feature point position correction processes a to c, that is, 14a to 14c, and are executed to correct the positions of feature points dedicated to the front-, right-, and left-facing faces, respectively. In dimension reduction processing (S803a to S803c), dimension reduction processing is executed using second projection matrices 83a to 83c for the corrected feature point vector data generated in the dimension restoration processing (S804d). In this case, the CPU 208 calculates projection vectors $P_a$ to $P_c$ by computation equivalent to that of equation (9) using the second projection matrices 83a to 83c having projection matrices $E_a$ to $E_c$ and average vectors $A_a$ to $A_c$, respectively. The projection matrices $E_a$, $E_b$, and $E_c$ include vectors generated by principal component analysis using learning feature point vectors corresponding to the front-, right-, and left-facing faces, respectively. Also, the average vectors $A_a$, $A_b$, and $A_c$ are generated using feature point vectors corresponding to the front-, right-, and left-facing faces, respectively. In dimension restoration processing (S804a to S804c), data on the feature point vectors of the original dimensions (that is, the coordinate positions) are restored from the projection vector $P_a$, $P_b$, and $P_c$, respectively, as in the dimension restoration processing (S104a to S104c) in the first embodiment. Thus, a plurality of dimensionally restored vector data are acquired for each type of fluctuation of the object.

In the fluctuation determination processing (S805), the CPU 208 reads out the projection vector $P_d$ as the result of the dimension reduction processing (S803d) from the RAM 210 to estimate a fluctuation of the target face. The fluctuation determination processing (S805) and the integration processing (S806) according to the second embodiment will be described with reference to FIG. 9. Reference numeral 901 denotes processing details on the fluctuation determination processing (S805). Steps S901 to S903 correspond to SVM identification computation processing, and fluctuation determination computation is executed for the projection vector $P_d$. Note that steps S901 to S905 also indicate the operations of the CPU 208. In steps S901 to S903, SVM computation described by:

$$(\text{Determination Result})_n = \text{sign}(W_n^T P_d - h) \qquad (13)$$

where $W_n^T = (w_{n,1}, w_{n,2}, \ldots, w_{n,p})$, h is a threshold, and n is 1 to 3 (corresponding to SVM identifiers 1 to 3, respectively), is executed.

Equation (13) describes a linear SVM, and $W_n$ is a weighting factor learned by the SVM in advance. In this embodiment, $W_n$ is a weighting factor vector having factors for elements, the number of which is equal to the number of dimensions of the projection vector. $W_1$ is a weighting factor used to determine whether the face orientation is the front or the right. Similarly, $W_2$ is a weighting factor used to determine whether the face orientation is the right or the left, and $W_3$ is a weighting factor used to determine whether the face orientation is the left or the front. In steps S901 to S903, the respective types of determination are performed using the weighting factors $W_1$ to $W_3$, respectively. In majority decision processing (S904), the face orientation is decided from each determination result obtained by the SVM identification computation processing (S901 to S903). Note that the fluctuation determination processing (S805) is not limited to the method described in this embodiment, and identification methods other than SVMs are also applicable to this processing.

Reference numeral 902 denotes details on the integration processing (S806), and a corrected feature point vector for a corresponding fluctuation is selected in accordance with the fluctuation determination result by selection processing (S905). The CPU 208 obtains feature point position coordinate data from the final feature point vector data as the integration result, and records it in the RAM 210. In second barycenter search processing (S107), barycenter search is executed within a region limited in accordance with the integration result to ultimately decide the final feature point position, as in the first embodiment.

To select one of the results of the feature point position correction processes a to c in the integration processing (S806), a necessary feature point position correction process (that is, one of the feature point position correction processes 84a to 84c) need only be executed, as shown above in the second embodiment. Alternatively, a method of outputting the determination reliabilities in the SVM identification computation processing (S901 to S903) of the fluctuation determination processing (S805), and weighting and integrating each correction result may be adopted, as shown in the first embodiment.

As described above, according to the second embodiment, the projection vector $P_d$ onto the subspace containing all types of fluctuations (common subspace) can be extracted. This makes it possible to estimate fluctuations from data of fewer dimensions, thus decreasing the amount of computation in fluctuation determination. This is effective especially when a complex fluctuation determination method is adopted or the object has a great number of types of fluctuations. Also, feature point positions are hierarchically corrected, thus achieving more stable correction processing.

Third Embodiment

Figure 10:
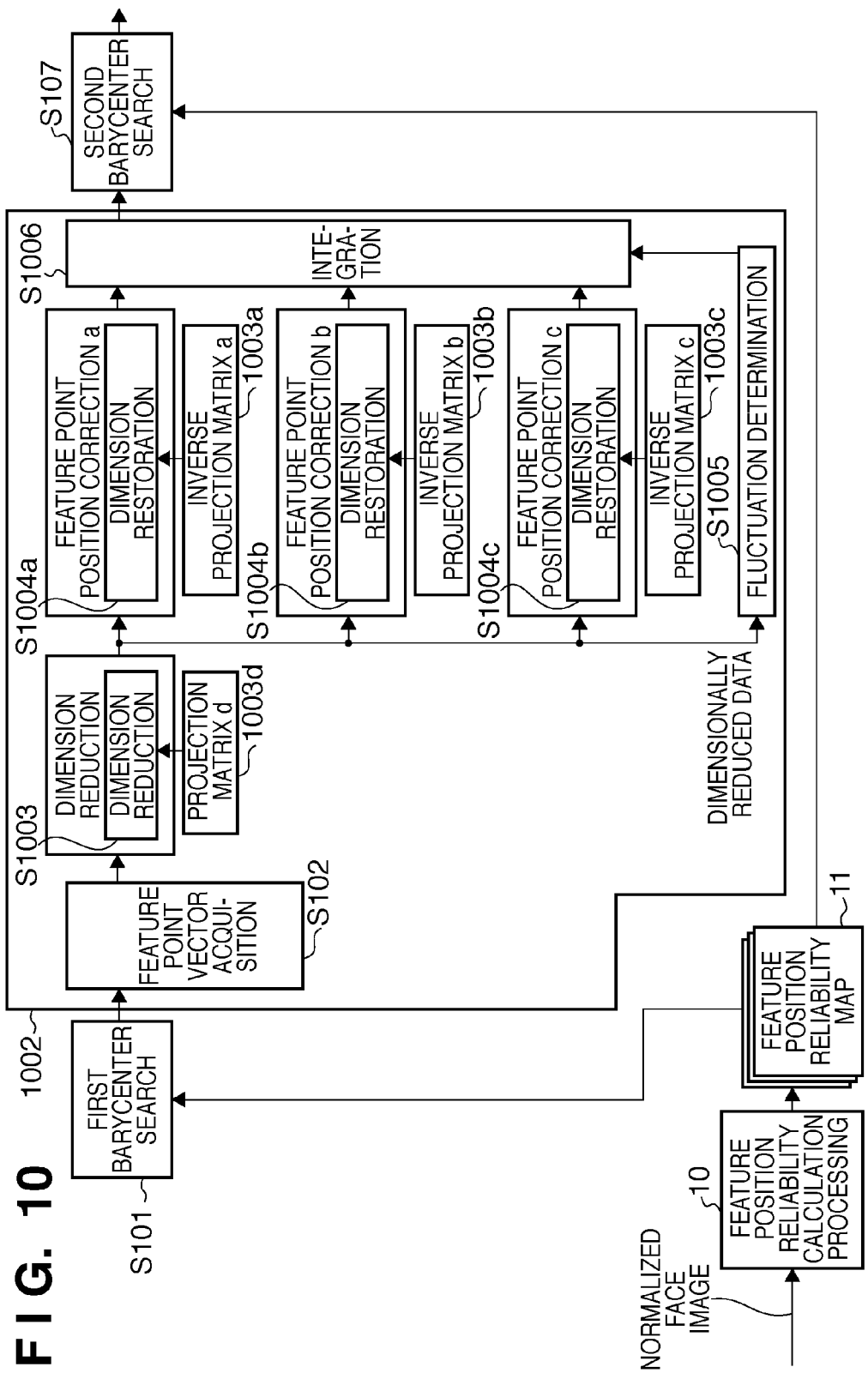
FIG. 10 is a flowchart for explaining position correction processing according to the third embodiment.
Figures 11A, 11B:
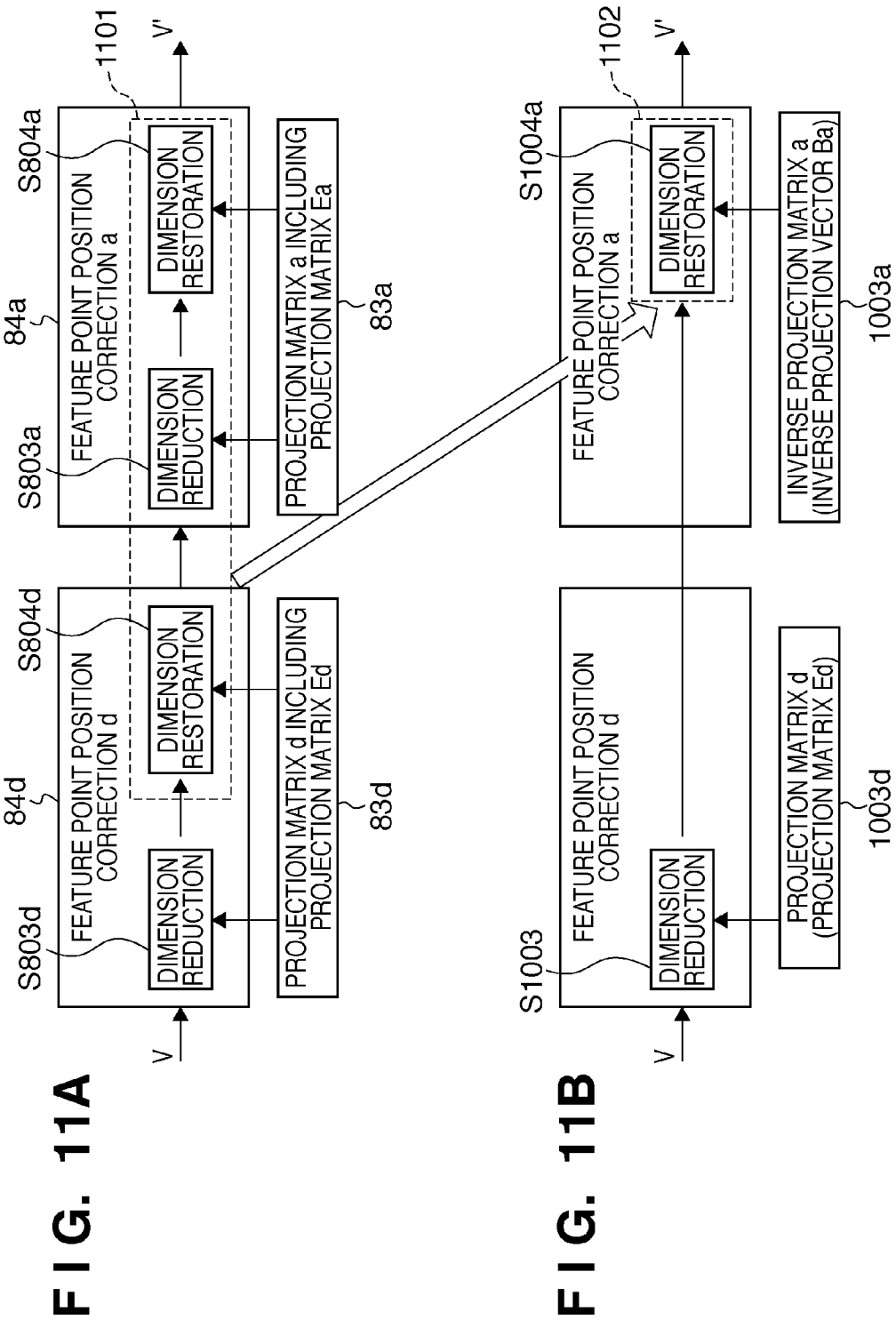
FIGS. 11A and 11B are flowcharts for explaining inverse projection matrix generation according to the third embodiment.

An image processing apparatus according to the third embodiment will be described below with reference to FIGS. 10, 11A and 11B. The image processing apparatus according to the third embodiment also has the same configuration (FIG. 2) as in the first embodiment, and provides a function of deciding a plurality of feature point positions in a face image. Differences of the third embodiment from the first embodiment will be mainly explained below.

Image processing by the image processing apparatus according to the third embodiment will be described with reference to FIG. 10. The same reference numerals as in the first embodiment (FIG. 1) denote the same configurations in FIG. 10. Feature point position correction processing 1002 according to the third embodiment will be described below. In this embodiment, first, a projection vector onto a subspace containing all types of fluctuations (common subspace) is calculated. A corrected feature point vector is generated using an inverse projection vector generated for each type of fluctuation from the projection vector as the result of calculation. Also, fluctuations are determined from the projection vector, and fluctuation-specific corrected feature point vectors are integrated using the result of determination. A detailed operation will be described hereinafter. Note that a CPU 208 executes each type of processing to be described below.

In first barycenter search processing (S101), a candidate for the feature point position is searched for by referring to a feature-specific feature position reliability map 11 stored in a RAM 210, and the search result is stored in the RAM 210, as in the first embodiment. A feature point vector is acquired from a plurality of feature point candidate coordinate data stored in the RAM 210 (S102). The relationship between the feature point coordinate data and the feature point vector is the same as in the example given in the first embodiment. In dimension reduction processing (S1003), dimension reduction processing is executed using a projection matrix $E_d$ generated from a plurality of feature point vectors containing all types of fluctuations. The projection matrix $E_d$ used herein is the same as the projection matrix onto the common subspace, which has been shown in the second embodiment. That is, the projection matrix $E_d$ is calculated in advance by principal component analysis from a considerable number of learning feature point vectors containing all types of fluctuations to be determined. In dimension reduction processing (S1003), using a projection matrix 1003d (the projection matrix $E_d$ and an average vector $A_d$), dimension reduction processing is executed in accordance with:

$$P_d = E_d^T (V - A_d) \qquad (14)$$

The average vector $A_d$ is also the same as in the second embodiment.

In dimension restoration processing (S1004a to S1004c), corrected feature point vectors are generated from the projection vector $P_d$ using inverse projection matrices 1003a to 1003c generated for respective types of fluctuations. The inverse projection matrices 1003a to 1003c include inverse projection matrices $B_a$ to $B_c$ and average vectors $C_a$ to $C_c$. A method of generating the inverse projection matrices $B_a$ to $B_c$ will be described below. FIG. 11A shows the feature point position correction processes 84d and 84a and the projection matrices 83d and 83a, which are shown in FIG. 8 (second embodiment). In this case, a feature point for the front-facing face is hierarchically corrected by sequentially executing dimension reduction processing (S803d), dimension restoration processing (S804d), dimension reduction processing (S803a), and dimension restoration processing (S804a). Computation in each processing step mentioned above is linear matrix computation presented in, for example, equation (9) or (12). Then, a corrected feature point vector $V_a'$ is given by:

$$V_a' = E_a E_a^T ((E_d P_d + A_d) - A_a) + A_a \qquad (15)$$

$$E_a = (u_{a,1}, u_{a,2}, \ldots, u_{a,p}) \qquad (16)$$

$$E_d = (u_{d,1}, u_{d,2}, \ldots, u_{d,p}) \qquad (17)$$

$$A_a = (A_{a,1}, A_{a,2}, A_{a,3}, \ldots, A_{a,2 \times f})^T \qquad (18)$$

$$A_d = (A_{d,1}, A_{d,2}, A_{d,3}, \ldots, A_{d,2 \times f})^T \qquad (19)$$

where $E_d$ and $A_d$ are the projection matrix and the average vector, respectively, which are generated from learning feature point vectors containing all types of fluctuations, and $E_a$ and $A_a$ are the projection matrix and the average vector, respectively, which are generated from learning feature point vectors containing only the front-facing face.

Since equation (14) includes only linear matrix computations, matrix composition yields:

$$V_a' = E_a E_a^T E_d P_d + E_a E_a^T (A_d - A_a) + A_a = B_a P_d + C_a \qquad (20)$$

where $B_a$ is a newly generated projection matrix given by:

$$B_a = E_a E_a^T E_d \qquad (21)$$

and $C_a$ is a newly generated average vector given by:

$$C_a = E_a E_a^T (A_d - A_a) + A_a \qquad (22)$$

Both the projection matrix $B_a$ and the average vector $C_a$ can be calculated prior to the processing. That is, a series of processing steps denoted by reference numeral 1101 in FIG. 11A can be combined into dimension restoration processing (S1004a) denoted by reference numeral 1102 in FIG. 11B. As described above, in the dimension restoration processing (S1004a), inverse projection processing is performed using the inverse projection matrix 1003a (the inverse projection matrix $B_a$ and the average vector $C_a$) generated in advance in accordance with equations (21) and (22). With the foregoing processing, correction processes dedicated to fluctuations (a correction process dedicated to the front-facing face in this case) can be realized.

Similarly, using a projection matrix $E_b$ and an average vector $A_b$ which are generated using learning feature point vectors corresponding to the right-facing face as a specific fluctuation, inverse projection computation (S1004b) is executed in accordance with:

$$V_b' = B_b P_d + C_b \qquad (23)$$

The projection matrix $B_b$ and the average vector $C_b$ used herein are respectively calculated in advance in accordance with:

$$B_b = E_b E_b^T E_d \qquad (24)$$

$$C_b = E_b E_b^T (A_d - A_b) + A_b \qquad (25)$$

Similarly again, using a projection matrix $E_c$ and an average vector $A_c$ which are generated using learning feature point vectors corresponding to the left-facing face as a specific fluctuation, inverse projection computation (S1004c) is executed in accordance with:

$$V_c' = B_c P_d + C_c \quad (26)$$

The projection matrix $B_c$ and the average vector $C_c$ used herein are respectively calculated in advance in accordance with:

$$B_c = E_c E_c^T E_d \quad (27)$$

$$C_c = E_c E_c^T (A_d - A_c) + A_c \quad (28)$$

In the foregoing way, a plurality of dimensionally restored vector data are acquired for each type of fluctuation of the object. In fluctuation determination processing (S1005), the type of fluctuation is determined from the projection vector $P_d$ in the same way as in the third embodiment (S805). In integration processing (S1006), the results of dimension restoration processing (S1004a to S1004c) are integrated in accordance with the determination result obtained by the fluctuation determination processing (S1005). The integration processing (S1006) may be performed using the same method as described in the first and second embodiments. In second barycenter search processing (S107), the final feature position is decided from the feature position reliability map 11 on the RAM 210 based on the finally decided feature point coordinates. The second barycenter search processing may be the same as in the first and second embodiments.

According to the third embodiment, computational matrices obtained by combining computation for dimension restoration using a projection matrix 1003d and those for dimension reduction and dimension restoration using the projection matrix 83a and projection matrices 83b and 83c, which are obtained by learning data for each type of fluctuation, are used. This makes it possible to obtain the same result as in the second embodiment with a smaller number of computations. It is also possible to output a projection vector onto a common subspace, as in the second embodiment. Moreover, according to the third embodiment, a projection matrix for dimension compression and an inverse projection vector generated by compositing projection matrices for each type of fluctuation can be calculated in advance, thus realizing geometric correction processing which copes with a large fluctuation with a smaller number of computations. Also, a projection vector onto a common subspace for fluctuation determination can be generated, thus estimating a fluctuation with a smaller number of computations.

Fourth Embodiment

Figure 13:
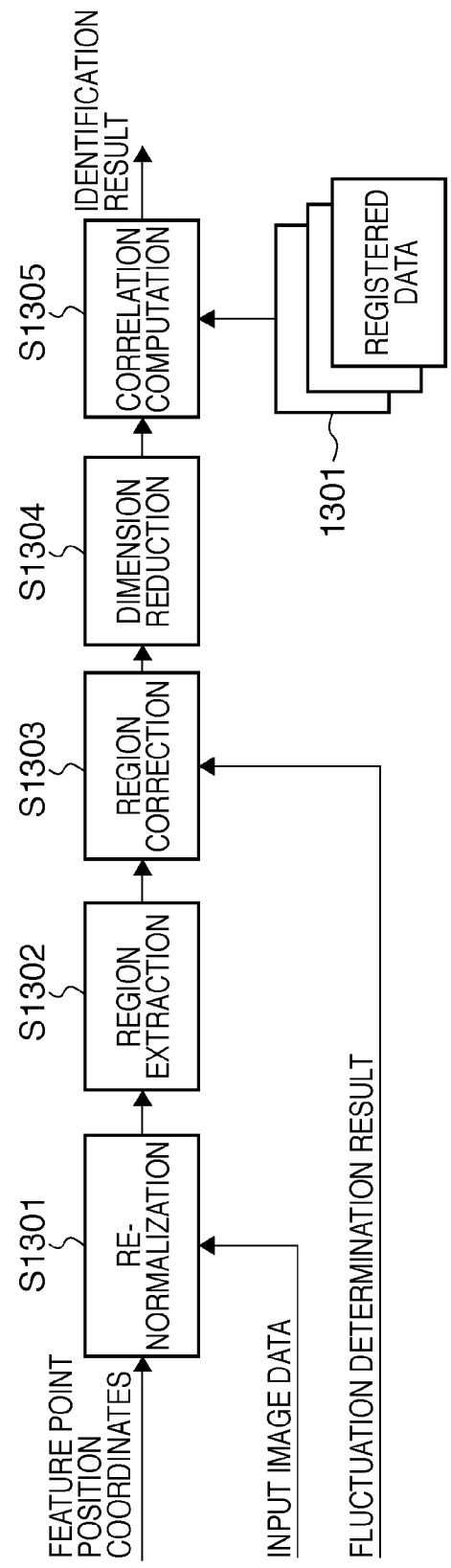
FIG. 13 is a flowchart for explaining identification processing according to the fourth embodiment.
Figure 14:
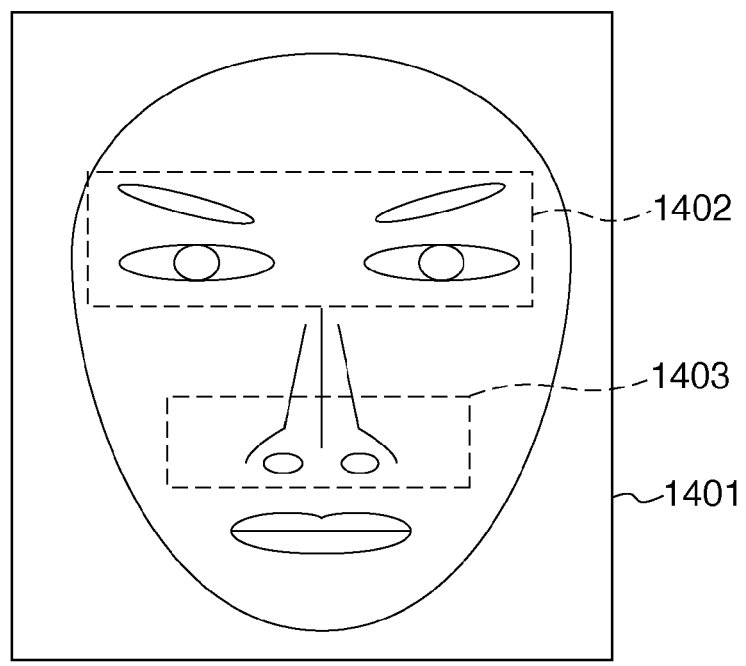
FIG. 14 is a view for explaining region extraction processing according to the fourth embodiment.

An image discrimination apparatus according to the fourth embodiment will be described below with reference to FIGS. 12 to 14. An image discrimination apparatus which provides a function of executing feature extraction based on the position of a feature point, and executing identification processing based on the extraction result will be described in the fourth embodiment. Note that the image discrimination apparatus according to the fourth embodiment also has the same configuration as in the first embodiment (FIG. 2). The operation of the image discrimination apparatus according to the fourth embodiment will be described with reference to FIG. 12. Note that feature position reliability calculation processing 10, a feature position reliability map 11, first barycenter search processing (S101), and feature point position correction processing 1002 in FIG. 12 are the same as in the third embodiment.

In second barycenter search processing (S1201), a feature position reliability map stored in a RAM 210 is searched again in accordance with corrected feature point position coordinate data. In this embodiment, the search parameter for the second barycenter search processing (S1201) is changed in accordance with the result of fluctuation determination processing (S1005). For example, the width or height of the search region is changed in accordance with the magnitude of a fluctuation. Note that an optimum search region and parameter corresponding to a fluctuation can be obtained in advance by learning. That is, a corrected feature point position is calculated from a plurality of learning image data prepared for each type of fluctuation to obtain a search region 607 (FIG. 6), from which a position that is statistically closest to a correct position can be output, while changing the search region. The search parameter used herein is stored in the RAM 210 or a ROM 209 as table information. A CPU 208 decides a necessary search region by looking up a table at a predetermined address in accordance with the result of the fluctuation determination processing (S1005). Not only the size or shape of the search region but also the parameter such as the threshold for the barycenter search may be prepared and switched for each type of fluctuation.

In identification processing (S1202), identification processing is executed in accordance with the obtained feature point position coordinate information. FIG. 13 is a flowchart for explaining details of the identification processing (S1202) according to the fourth embodiment. In re-normalization processing (S1301), the CPU 208 re-normalizes a face image based on the feature point position coordinates. In this case, face image data is converted to have a predetermined size based on, for example, the width of the eye or the distance between the eye and the mouth. In region extraction processing (S1302), the CPU 208 sets an image region for use in identification, based on the feature point position coordinates. FIG. 14 is a view for explaining an example of extraction regions extracted from re-normalized face image data 1401. Reference numerals 1402 and 1403 denote extraction regions that are predetermined regions extracted based on the coordinate positions of the eyes, nose, and mouth. In region correction processing (S1303), the CPU 208 transforms image data of the extracted regions in accordance with the result of the fluctuation determination processing (S1005). In this case, the partial region images extracted in the extraction processing (S1302) are transformed by, for example, affine transformation in accordance with a fluctuation in face orientation. A parameter for transformation is generated in advance by learning using a considerable amount of data in accordance with a fluctuation. That is, an affine parameter corresponding to a fluctuation in, for example, face orientation is decided in advance and switched in accordance with the result of the fluctuation determination processing (S1005). With the transformation processing in the region correction processing (S1303), the image data can be transformed into a partial region similar to the front-facing face even if the face in the data is different from the front-facing face.

In dimension reduction processing (S1304), the CPU 208 reduces the dimensionality of the corrected image data for use in identification. A conventionally proposed method such as a method that uses principal component analysis may be applied to the dimension reduction. In correlation computation processing (S1305), the CPU 208 performs correlation computation between the dimensionally reduced input face image data and registered data 1301 which is dimensionally reduced and registered in advance, thereby determining, for example, whether the input face image coincides with the registered data or which registered data corresponds to the input face image. The registered data is generated from a face image of a specific person that one wants to identify. Also, when a plurality of partial regions are used, correlation computation is performed for each region to perform determination using a plurality of obtained similarities. With the foregoing processing, a specific person is identified from the face image.

As described above, according to the fourth embodiment, a search parameter for the second barycenter search processing (S1201) is selected using the result of the fluctuation determination processing (S1005) in the feature point position correction processing, thereby making it possible to more precisely decide the position of a feature point. Also, the use of the result of the fluctuation determination processing (S1005) in the identification processing (S1202) allows identification with high accuracy.

Although a correction parameter for a partial region is selected using the fluctuation determination result in the fourth embodiment, the present invention is not limited to this. The parameter for the re-normalization processing (S1301) or that for the region extraction processing (S1302), for example, may be changed in accordance with a fluctuation. Alternatively, a method of changing the details of the dimension reduction processing (S1304) in accordance with the fluctuation determination result, for example, can also be adopted. Or again, a configuration in which registered data is prepared for each type of fluctuation and selected in accordance with the result of the fluctuation determination processing (S1005), for example, is also possible. Also, although an example in which the identification processing (S1202) is combined with the feature point position correction processing 1002 according to the third embodiment has been described in the fourth embodiment, the identification processing can also be combined with the feature point position correction processing 12 or 82 according to the first or second embodiment, respectively, as a matter of course.

Fifth Embodiment

Although the present invention is applied to feature point correction in the first to fourth embodiments, it is applied to image data correction in the fifth embodiment. Note that an image processing apparatus according to the fifth embodiment also has the same configuration as in the first embodiment (FIG. 2). However, a feature position reliability calculation unit 204 is not always necessary. An operation according to this embodiment will be described below with reference to FIG. 15.

Figure 15:
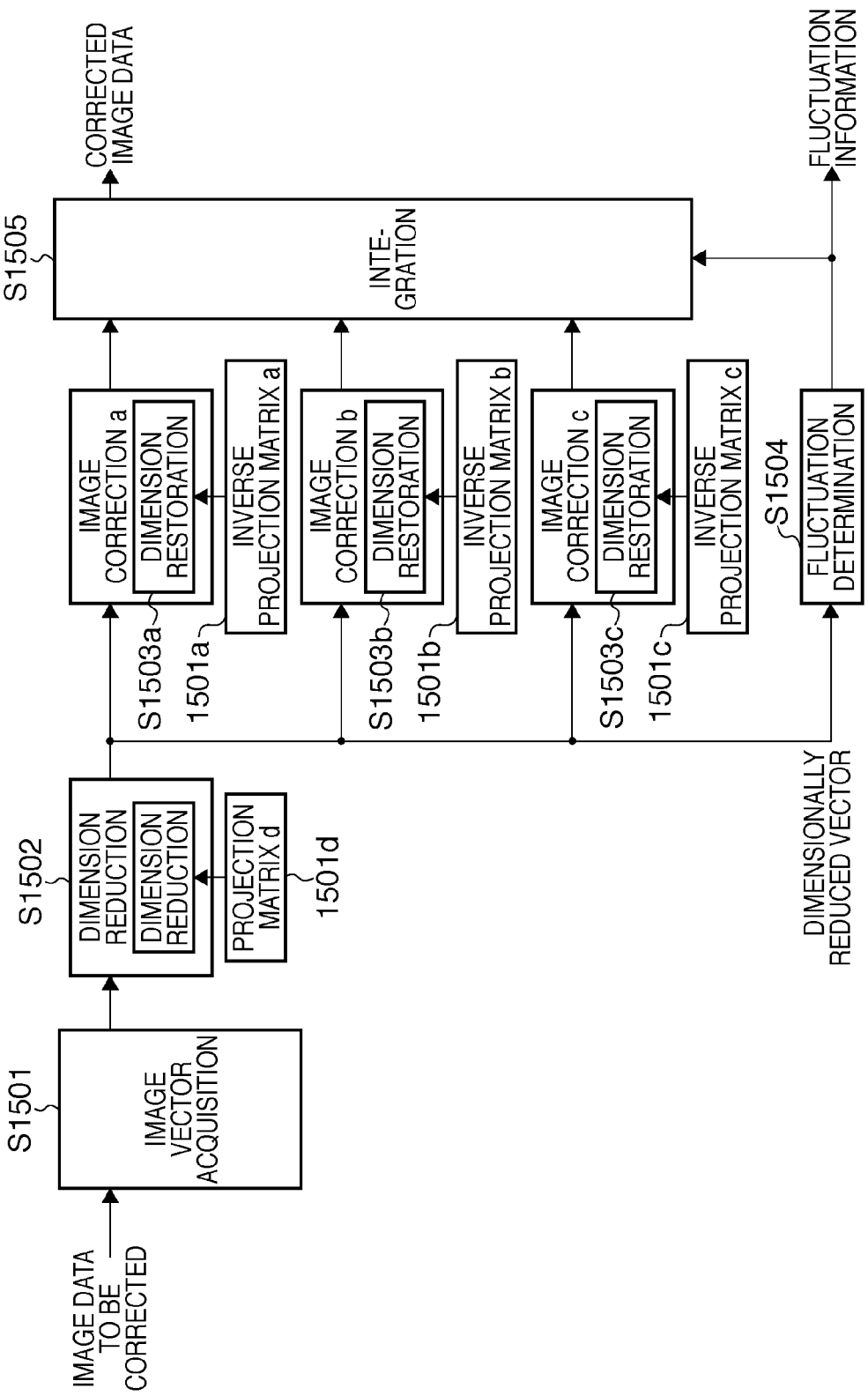
FIG. 15 is a flowchart for explaining image correction processing according to the fifth embodiment.

FIG. 15 is a flowchart for explaining processing when image data correction processing is implemented using the apparatus shown in FIG. 2. In image vector acquisition processing (S1501), a CPU 208 reads out extracted face image data stored in a RAM 210 to generate vector data I containing pixel values as elements:

$$I = (i_1, i_2, i_3, \ldots, i_n)^T$$

where $i_n$ is the pixel value, and n is the total number of pixels within the extracted image region.

In dimension reduction processing (S1502), the CPU 208 projects an image vector onto a subspace using a projection matrix 1501d (a projection matrix $E_d$ and an average vector $A_d$). $E_d$ and $A_d$ are the projection vector and the average vector, respectively, which are calculated by principal component analysis using a considerable number of learning image vectors containing various types of fluctuations. Note that the learning data set used herein contains neither defective images nor occlusion images. An n-dimensional vector is compressed to a p-dimensional vector (n>p) by projection computation using the projection matrix 1501d. That is, in the dimension reduction processing (S1502), a dimensionally reduced vector $P_d$ is generated in accordance with:

$$P_d = E_d^T (I - A_d) \tag{29}$$

$$A_d = (A_{d,1}, A_{d,2}, A_{d,3}, \ldots, A_{d,n})^T \tag{30}$$

$$E_d = (u_{d,1}, u_{d,2}, \ldots, u_{d,p}) \tag{31}$$

where $u_{d,1}, u_{d,2}, \ldots, u_{d,p}$ are the n-dimensional normalized orthogonal vectors, respectively, which are obtained by principal component analysis.

In dimension restoration processing (S1503a), the CPU 208 calculates a corrected image data vector $I_a$ by matrix computation described by:

$$I_a = B_a P_d + C_a \tag{32}$$

where $B_a$ is a projection matrix which is generated in advance and given by:

$$B_a = E_a E_a^T E_d \tag{33}$$

and $C_a$ is an average vector which is generated in advance and given by:

$$C_a = E_a E_a^T (A_d - A_a) + A_a \tag{34}$$

where $E_d$ and $A_d$ are the projection matrix and the average vector, respectively, in the projection matrix 1501d, and $E_a$ and $A_a$ are the projection matrix and the average vector, respectively, which are generated by principal component analysis using a considerable number of learning image vectors corresponding to a specific fluctuation. The projection vector generated using a front-facing face image is used herein. The calculation equations of the projection matrix $B_a$ and the average vector $C_a$ which are actually used in the dimension restoration processing (S1503a) are the same as in the third embodiment, and are a combination of matrix computations necessary for two correction processes, as shown in FIGS. 11A and 11B. An inverse projection matrix 1501a includes the inverse projection matrix $B_a$ and the average vector $C_a$.

Similarly, a projection matrix $E_b$ and an average vector $A_b$ are calculated using a considerable amount of image data of the right-facing face as a specific fluctuation to calculate a projection matrix $B_b$ and an average vector $C_b$, respectively, which are used in dimension restoration processing (S1503b) in accordance with:

$$B_b = E_b E_b^T E_d \tag{35}$$

$$C_b = E_b E_b^T (A_d - A_b) + A_b \tag{36}$$

An inverse projection matrix 1501b includes the inverse projection matrix $B_b$ and the average vector $C_b$. In the dimension restoration processing (S1503b), a corrected image vector is generated in accordance with:

$$I_b' = B_b P_d + C_b \tag{37}$$

Similarly again, a projection matrix $E_c$ and an average vector $A_c$ are calculated using a considerable amount of image data corresponding to the left-facing face as a specific fluctuation to calculate a projection matrix $B_c$ and an average vector $C_c$, respectively, which are used in dimension restoration processing (S1503c) in accordance with:

$$B_c = E_c E_c^T E_d \tag{38}$$

$$C_c = E_c E_c^T (A_d - A_c) + A_c \tag{39}$$

An inverse projection matrix 1501c includes the inverse projection matrix $B_c$ and the average vector $C_c$. In the dimension restoration processing (S1503c), a corrected image vector is generated in accordance with:

$$I_c' = B_c P_d + C_c \tag{40}$$

In the foregoing way, an image vector corrected for each specific fluctuation is obtained by the three types of restoration processing (S1503a to S1503c). That is, a plurality of dimensionally restored vector data are acquired for each type of fluctuation of the object. Note that the projection vectors used in generating the projection matrices $E_a$ to $E_c$ are generated from learning image data with neither a defect nor occlusion. For this reason, a corresponding defect or occlusion cannot be represented in a space dimensionally reduced using the projection vector. In view of this, when the input image data has a defect or occlusion, image data which is statistically interpolated by the dimension reduction processing (S1502) and the dimension restoration processing (S1503a to S1503c) can be generated. This makes it possible to appropriately correct a face image containing an anomalistic image pattern.

In fluctuation determination processing (S1504), the CPU 208 estimates a fluctuation using the dimensionally reduced vector $P_d$ obtained by the dimension reduction processing (S1502). In this case, the face orientation is estimated. The method shown in the second embodiment (FIG. 9) is applicable to the fluctuation determination processing (S1504), and fluctuation determination processing can be realized with a small amount of computation by performing fluctuation determination from the dimensionally reduced data for the common subspace. The fluctuation determination result obtained by the fluctuation determination processing (S1504) is recorded in a predetermined region of the RAM 210. The recorded information can be used in subsequent processing.

In step S1505, the results of the respective types of dimension reduction processing in steps S1503a to S1503c are integrated in accordance with the fluctuation determination result. In the integration processing of step S1505, the final image vector is calculated by, for example, simple selection or a weighted average method in the same way as in the first embodiment. A corrected image vector as the final result after integration is recorded in the RAM 210 as corrected image data.

As described above, according to the fifth embodiment, image data having a large fluctuation can be statistically, appropriately corrected. For example, the recognition accuracy can be improved by applying the correction processing according to the fifth embodiment to face recognition preprocessing. Also, a projection vector onto a low-dimensional common subspace can be generated in the process of the correction processing. The type of fluctuation can be determined with a small amount of computation using the generated projection vector. The basic computation method in the fifth embodiment is the same as that shown in the third embodiment, but brings about a greater effect of decreasing the amount of computation because the data used has more dimensions in the fifth embodiment than in the third embodiment. It would be apparent to those skilled in the art that the position correction processing described in each of the first and second embodiment is also applicable to image correction.

Other Embodiments

Although a linear SVM is used as a fluctuation determination method in each of the above-described embodiments, the present invention is not limited to this, and a variety of methods can be adopted. When, for example, a non-linear SVM is adopted, the number of computations considerably increases, so the fluctuation determination effect produced from fewer data (projection vectors) as a feature of the present invention enhances.

Also, although a projection vector is projected onto a subspace using a projection matrix generated by principal component analysis in each of the above-described embodiments, other methods may be used.

Moreover, to improve the accuracy of fluctuation determination processing (in, for example, step S106), dimension reduction may be performed using a projection matrix generated by a conventionally proposed method advantageous to class determination for data after projection, such as LPP or LFDA. Note that LPP is an abbreviation for "Locality Preserving Projection", and LFDA is an abbreviation for "Local Fisher Discriminant Analysis". As shown in the second to fifth embodiments, in the present invention, correction is performed based on projection computation onto an arbitrary common subspace, so a projection matrix as mentioned above can be adopted. This makes it possible to improve the correction accuracy.

Although the face orientation has been exemplified as a fluctuation to be determined by fluctuation determination processing (in, for example, step S104) in each of the above-described embodiments, the present invention is not limited to this, and various types of fluctuations such as a fluctuation in facial expression can be coped with. In this case as well, fluctuation determination processing can be similarly performed only by preparing learning data containing target fluctuations and calculating a projection matrix. In other words, there is no need to, for example, set an empirical rule according to which a fluctuation is coped with.

Although the present invention is applied to identification of the face of a person in each of the above-described embodiments, it is not limited to this, and is available in deciding feature points of various types of objects. The present invention is applicable to all cases, in which the arrangement of feature points is constrained for each category of an object, such as human bodies, animals, and industrial products such as vehicles. In these cases as well, geometric constraint processing can be realized with high accuracy only by preparing a plurality of feature point arrangement data of a target category for each type of fluctuation.

Although the number of dimensions of the subspace is common for each type of fluctuation in each of the above-described embodiments, the present invention is not limited to this. The number of dimensions may be changed for each type of fluctuation. The same holds true even when a new projection vector is generated by the composition described in each of the third to fifth embodiments. Since the number of dimensions which achieves optimum correction differs depending on the type of fluctuation, the correction performance improves upon changing this number. Also, the number of dimensions of the common subspace for use in fluctuation determination may be changed to that of another subspace. Moreover, although the present invention is applied to a feature point extracted from general image data or to the image data itself in each of the above-described embodiments, it is also applicable when geometric constraint processing is performed for feature data based on another sensing information.

An optimum subspace can be generated in accordance with a fluctuation by changing the projection matrix generation methods for dimension reduction and dimension restoration in accordance with the fluctuation, thus improving the fluctuation estimation accuracy. In the second and third embodiments, a projection matrix for use in fluctuation estimation can be efficiently, effectively generated by generating a first projection matrix using a dimension compression method suitable for the fluctuation estimation. The dimensionality of the result of dimension reduction that uses a projection matrix may differ depending on the type of fluctuation. This makes it possible to generate an optimum subspace in accordance with a fluctuation.

Organ detection robust against, for example, fluctuations in face orientation, face shape, and facial expression can be realized by setting the face of a person as an object (category) and position coordinate data associated with a face organ as feature data. Statistical image interpolation can be realized for image data containing a large fluctuation by setting the pixel value of an object as feature data associated with the object.

According to the present invention, the position of a feature point or image data can be appropriately corrected with simple processing even if the object has a large fluctuation.

The present invention is widely applicable to, for example, an apparatus which decides the arrangement of feature points and various kinds of image forming apparatuses.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298820, filed Dec. 28, 2009, which is hereby incorporated by reference herein in its entirety.

What is claimed is:

1. A data correction apparatus which corrects data associated with an image of an object, comprising:
    an input unit configured to input vector data obtained by combining data to be corrected;
    a generation unit configured to execute dimension reduction processing by projecting the vector data onto a subspace to generate a dimensionally reduced projection vector, and dimension restoration processing by restoring a dimensionality of the dimensionally reduced projection vector to generate a plurality of dimensionally restored vector data for respective types of fluctuation of the object in the image;
    a determination unit configured to determine the fluctuation of the object; and
    an output unit configured to determine corrected data based on the plurality of dimensionally restored vector data and the fluctuation of the object determined by said determination unit, and to output the corrected data.

2. The apparatus according to claim 1, wherein
said generation unit generates a plurality of dimensionally reduced projection vectors by projecting the vector data onto the subspace using a plurality of projection matrices prepared for respective types of fluctuation, and restores dimensionalities of the plurality of projection vectors using the plurality of projection matrices, respectively, thereby generating a plurality of dimensionally restored vector data, and said determination unit determines the fluctuation of the object based on the plurality of projection vectors.

3. The apparatus according to claim 1, wherein said generation unit
    generates a dimensionally reduced, first projection vector, and first dimensionally restored vector data, by performing the dimension reduction processing and the dimension restoration processing using a first projection matrix generated by learning data on a plurality of types of fluctuations, and
    generates the plurality of dimensionally restored vector data by performing the dimension reduction processing and the dimension restoration processing for the first dimensionally restored vector data using a plurality of second projection matrices generated by learning the data for each type of fluctuation, and
    said determination unit determines the fluctuation of the object based on the first projection vector.

4. The apparatus according to claim 3, wherein said generation unit
    generates a dimensionally reduced, first projection vector by performing the dimension reduction processing using a first projection matrix generated by learning data on a plurality of types of fluctuations, and
    generates the plurality of dimensionally restored vector data from the first projection vector using a plurality of second projection matrices generated by learning the data for each type of fluctuation, and
    said determination unit determines the fluctuation of the object based on the first projection vector.

5. The apparatus according to claim 4, wherein each of the plurality of second projection matrices includes a computational matrix generated by combining computation with which the first projection vector is dimensionally restored using the first projection matrix and computations with which the first projection vector is dimensionally reduced and dimensionally restored by the projection matrix obtained by learning the data for each type of fluctuation.

6. The apparatus according to claim 1, wherein said output unit decides a weight of the plurality of dimensionally restored vector data based on the determination result obtained by said determination unit, and calculates a weighted average of the plurality of dimensionally restored vector data as the corrected data.

7. The apparatus according to claim 1, wherein the data associated with the image of the object includes feature data indicating a feature point position extracted from image data of the object.

8. The apparatus according to claim 1, wherein the data associated with the image of the object includes image data of the object.

9. An image discrimination apparatus comprising:
    a data correction apparatus defined in claim 1; and
    a discrimination unit configured to discriminate an object in an image using the corrected data.

10. A method of controlling a data correction apparatus which corrects data associated with an image of an object, comprising:
    an input step of inputting vector data obtained by combining data to be corrected;
    a generation step of executing dimension reduction processing by projecting the vector data onto a subspace to generate a dimensionally reduced projection vector, and dimension restoration processing by restoring a dimensionality of the dimensionally reduced projection vector to generate a plurality of dimensionally restored vector data for respective types of fluctuation of the object in the image;

a determination step of determining the fluctuation of the object; and an output step of determining corrected data based on the plurality of dimensionally restored vector data and the fluctuation of the object determined in the determination step, and outputting the corrected data.

11. A non-transitory computer readable storage medium storing a computer program for causing a computer to execute the method according to claim 10.

12. The apparatus according to claim 1, wherein
said determination unit determines the fluctuation of the object based on the dimensionally reduced projection vector.

13. The apparatus according to claim 1, wherein the object includes a face of a human.

14. The apparatus according to claim 13, wherein the data associated with the image of the object includes feature data indicating a feature point position in the face.

15. The apparatus according to claim 13, wherein the fluctuation of the object includes a direction of the face.

16. The apparatus according to claim 13, wherein the fluctuation of the object includes an expression of the face.

* * * * *